United States Patent
Imai et al.

(10) Patent No.: US 8,870,384 B2
(45) Date of Patent: Oct. 28, 2014

(54) PROJECTION DISPLAY DEVICE HAVING LIGHT SOURCE DEVICE WITH COLOR SYNTHESIS UNIT

(75) Inventors: Masao Imai, Minato-ku (JP); Goroh Saitoh, Minato-ku (JP); Fujio Okumura, Minato-ku (JP)

(73) Assignee: Nec Corporation, Tokyo (JP)

( * ) Notice: Subject to any disclaimer, the term of this patent is extended or adjusted under 35 U.S.C. 154(b) by 268 days.

(21) Appl. No.: 13/498,538

(22) PCT Filed: Sep. 16, 2010

(86) PCT No.: PCT/JP2010/066009
§ 371 (c)(1),
(2), (4) Date: Mar. 27, 2012

(87) PCT Pub. No.: WO2011/037057
PCT Pub. Date: Mar. 31, 2011

(65) Prior Publication Data
US 2012/0182525 A1 Jul. 19, 2012

(30) Foreign Application Priority Data
Sep. 28, 2009 (JP) ................ 2009-222704

(51) Int. Cl.
*G03B 21/14* (2006.01)
*G03B 21/00* (2006.01)
(Continued)

(52) U.S. Cl.
CPC ............ *G03B 21/2033* (2013.01); *G03B 21/14* (2013.01); *G03B 21/2073* (2013.01);
(Continued)

(58) Field of Classification Search
CPC ............... G03B 21/14; G03B 21/2033; G03B 21/2073; G03B 33/12; G03B 33/06; H04N 9/3105; H04N 9/3167; H04N 9/3197; G02B 5/04; G02B 5/3025; G02B 5/3058; G02B 27/10; G02B 27/1006; G02B 27/28; G02B 27/283; G02F 1/133528; G02F 1/133536
USPC ........... 353/20, 30–31, 33–34, 48–51, 81–82, 353/84, 94; 359/483.01, 485.01–485.07, 359/487.01–487.06, 490.01, 491.01; 349/8–9
See application file for complete search history.

(56) References Cited

U.S. PATENT DOCUMENTS 4,127,322 A * 11/1978 Jacobson et al. ................ 353/31
6,273,567 B1 * 8/2001 Conner et al. .................. 353/20
(Continued)

FOREIGN PATENT DOCUMENTS

CN 1517782 A 8/2004
CN 1519612 A 8/2004
(Continued)

OTHER PUBLICATIONS

Communication dated Mar. 5, 2014, issued by the State Intellectual Property Office of the People's Republic of China in corresponding Application No. 201080043048.0.
(Continued)

*Primary Examiner* — Tony Ko
*Assistant Examiner* — Jori S Reilly-Diakun
(74) *Attorney, Agent, or Firm* — Sughrue Mion, PLLC

(57) ABSTRACT

A light source device includes: a first light source (3a) that emits first polarized light of a plurality of colors including different wavelengths; a second light source (3b) that emits second polarized light whose polarization state differs from that of the first polarized light and that includes light of at least one color from among the plurality of colors; and a first color synthesis optical element (1) that synthesizes the first polarized light emitted from the first light source (3a) and the second polarized light emitted from the second light source (3b).

13 Claims, 21 Drawing Sheets

(51) Int. Cl.
*G03B 21/20* (2006.01)
*G02B 5/04* (2006.01)
*G02B 27/10* (2006.01)
*H04N 9/31* (2006.01)
*G03B 33/06* (2006.01)
*G03B 33/12* (2006.01)

(52) U.S. Cl.
CPC .................. *G02B 5/04* (2013.01); *G02B 27/10* (2013.01); *H04N 9/3105* (2013.01); *H04N 9/3167* (2013.01); *G03B 33/06* (2013.01); *G03B 33/12* (2013.01)
USPC ................... 353/33; 353/20; 353/31; 353/81; 353/84; 353/94; 359/485.06; 359/491.01; 349/9

(56) References Cited

U.S. PATENT DOCUMENTS

| | | | | |
|---|---|---|---|---|
| 6,561,654 | B2 * | 5/2003 | Mukawa et al. | 353/31 |
| 6,698,890 | B1 * | 3/2004 | Jorke | 353/7 |
| 6,733,139 | B2 * | 5/2004 | Childers et al. | 353/94 |
| 6,807,010 | B2 * | 10/2004 | Kowarz | 359/634 |
| 6,843,566 | B2 * | 1/2005 | Mihara | 353/29 |
| 6,921,176 | B2 * | 7/2005 | Tomita et al. | 353/94 |
| 7,204,605 | B2 * | 4/2007 | Kanayama et al. | 362/230 |
| 7,244,031 | B2 * | 7/2007 | Clark et al. | 353/84 |
| 7,244,032 | B2 * | 7/2007 | Inamoto | 353/94 |
| 7,293,880 | B2 * | 11/2007 | Sakata et al. | 353/94 |
| 7,515,343 | B2 * | 4/2009 | Edlinger et al. | 359/629 |
| 8,545,029 | B2 * | 10/2013 | Ma et al. | 353/94 |
| 2002/0186349 | A1 * | 12/2002 | Wichner et al. | 353/29 |
| 2005/0200812 | A1 | 9/2005 | Sakata et al. | |
| 2005/0248733 | A1 * | 11/2005 | Sakata et al. | 353/94 |
| 2006/0023172 | A1 | 2/2006 | Ikeda et al. | |
| 2007/0188865 | A1 | 8/2007 | Hall, Jr. | |
| 2007/0297061 | A1 | 12/2007 | Kyomoto et al. | |
| 2010/0309439 | A1 * | 12/2010 | Bi et al. | 353/33 |

FOREIGN PATENT DOCUMENTS

| | | |
|---|---|---|
| CN | 101295075 A | 10/2008 |
| CN | 101435916 A | 5/2009 |
| JP | 2000-305040 A | 11/2000 |
| JP | 2002-296680 A | 10/2002 |
| JP | 2003-075911 A | 3/2003 |
| JP | 2004-157405 A | 6/2004 |
| JP | 2005-257872 A | 9/2005 |
| JP | 2006-126644 A | 5/2006 |
| JP | 2006-138952 A | 6/2006 |
| JP | 2006-330282 A | 12/2006 |
| JP | 2006-337609 A | 12/2006 |
| JP | 2007-003847 A | 1/2007 |
| JP | 2007-528514 A | 10/2007 |
| JP | 2008-003125 A | 1/2008 |
| JP | 2008-083538 A | 4/2008 |
| JP | 2008-089929 A | 4/2008 |
| JP | 2008126644 A | 6/2008 |

OTHER PUBLICATIONS

Communication dated Aug. 5, 2014, from the Japanese Patent Office in counterpart Japanese Application No. 2011532973.

* cited by examiner

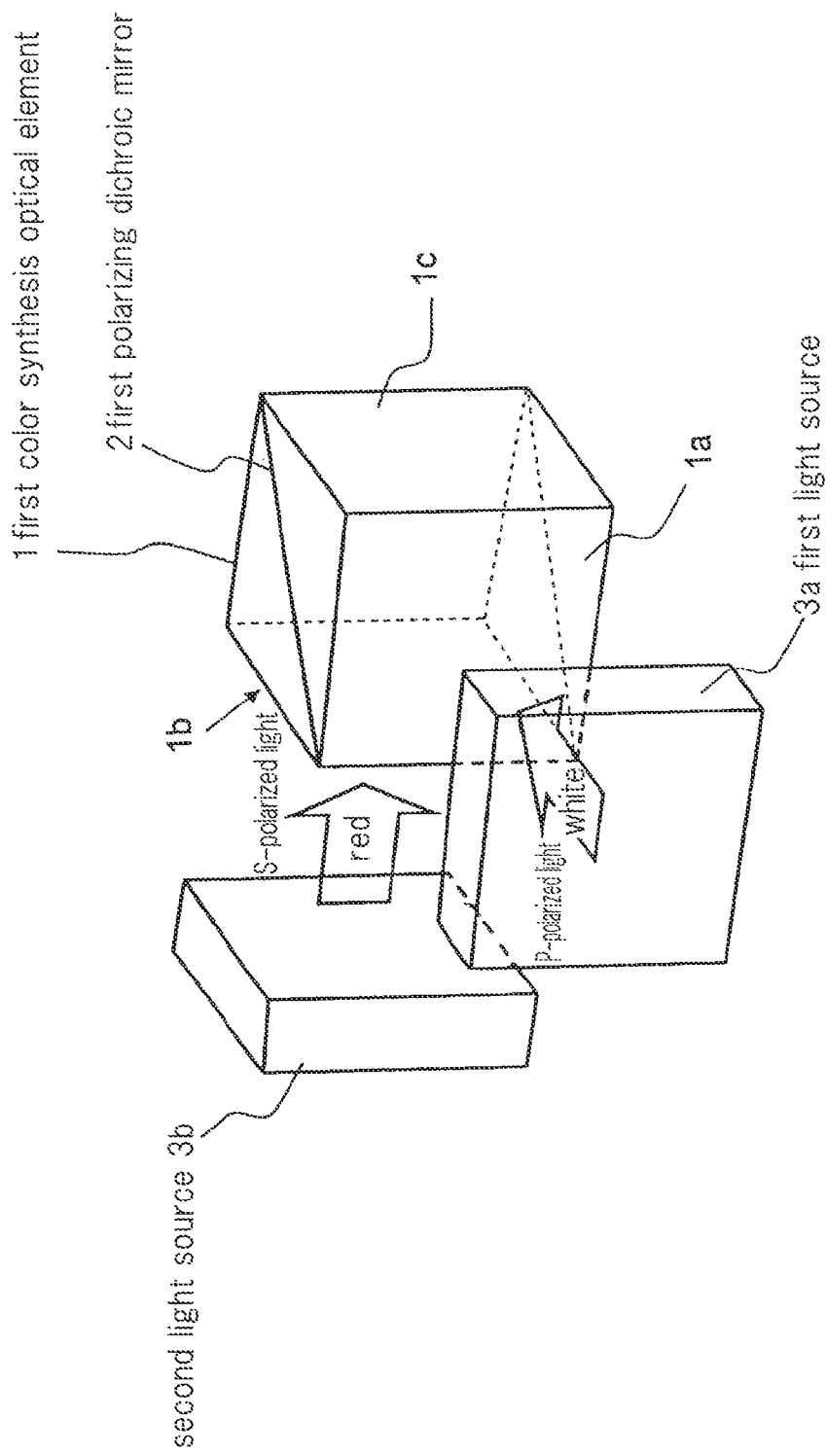

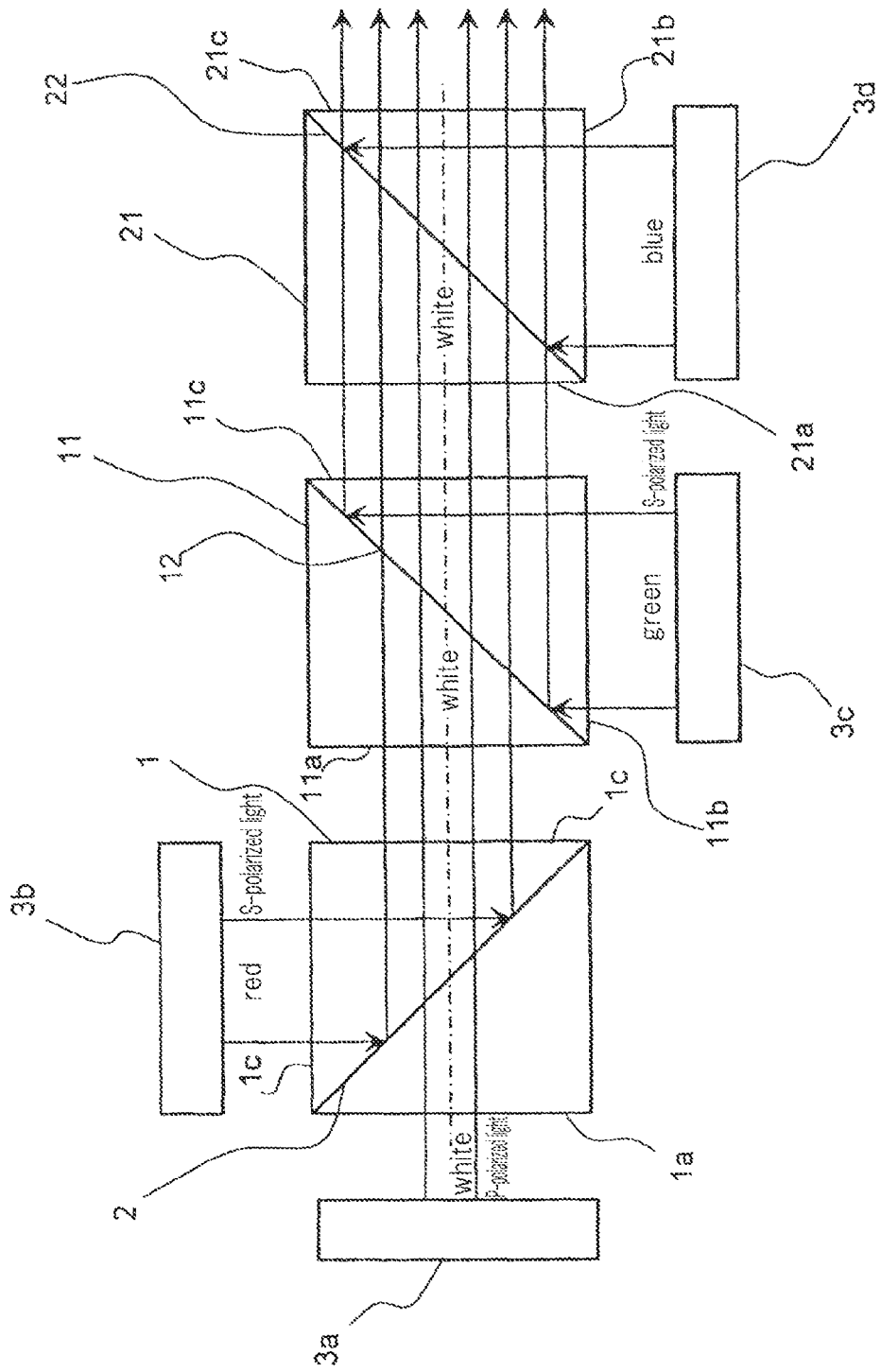

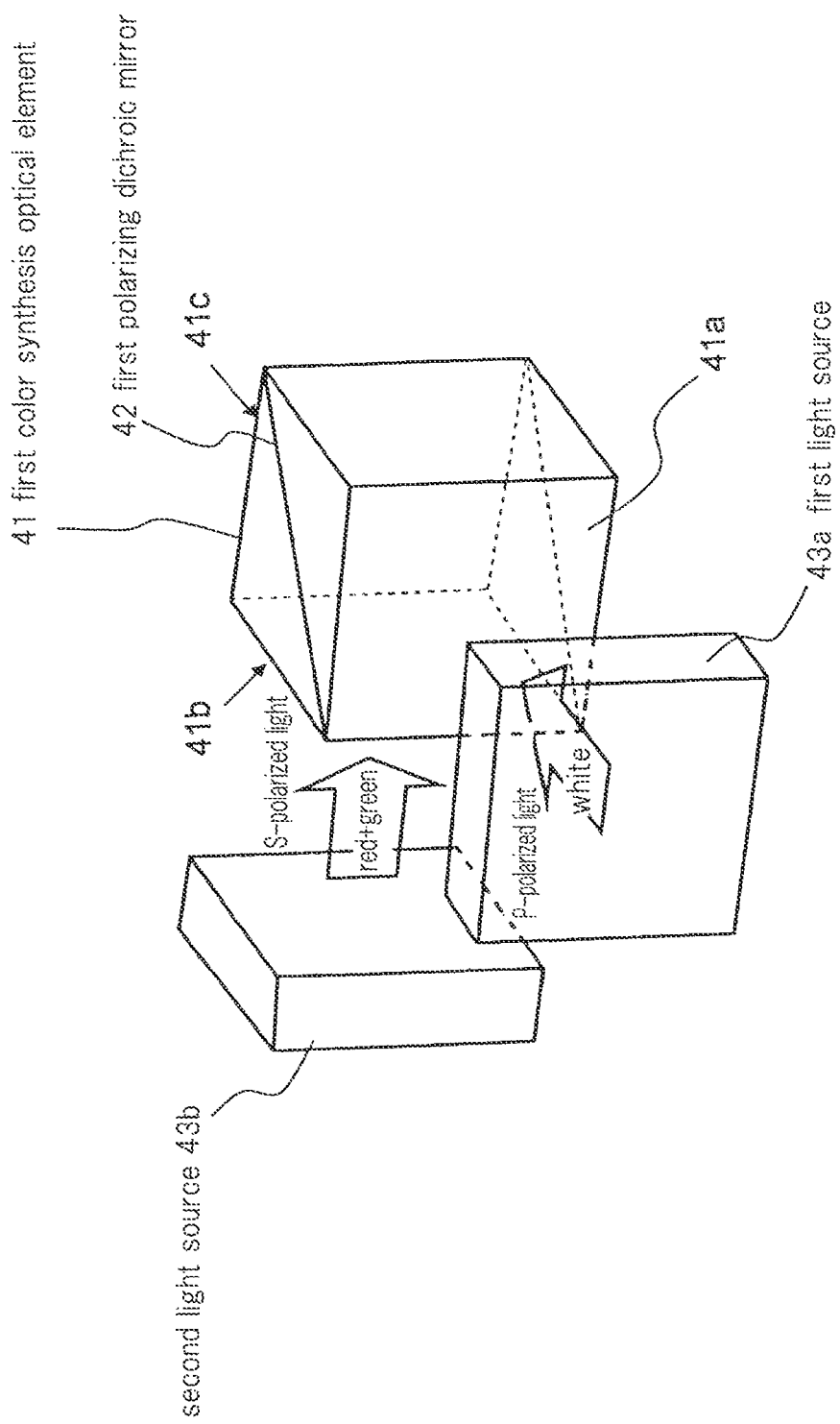

US 8,870,384 B2

PROJECTION DISPLAY DEVICE HAVING LIGHT SOURCE DEVICE WITH COLOR SYNTHESIS UNIT

TECHNICAL FIELD

The present invention relates to a projection-type display device of which a projector is representative, and more particularly relates to a light source device that produces an illumination light in which light of a plurality of colors is synthesized, and to a projection-type display device that uses this light source device.

BACKGROUND ART

A projection-type display device includes a light source device, display elements that are irradiated by illumination light from the light source device, and a projection lens that enlarges and projects the images displayed on the display elements onto a screen.

Projection-type display devices can be broadly divided between two types.

The first type of projection-type display device is made up of: a white light source; a plurality of dichroic mirrors that split white light into luminous flux of the three primary colors of red (R), green (G), and blue (B); three liquid crystal display elements that are irradiated by respective luminous flux of each of red (R), green (G), and blue (B) and that display images of each color component; a dichroic prism that again synthesizes the luminous flux of three primary colors into a single light beam; and a projection lens. This type of projection-type display device is referred to as a three-panel or 3LCD projection-type display device.

The second type of projection-type display device is made up of: a white light source; a color wheel on which color filters of red (R), green (G), and blue (B) are arranged in a disc form; one display element that, by irradiating light from the white light source onto the color wheel that is rotating at high speed, displays the image of a color component in synchronization with the switching of the color of illumination light in which colors are switched in a time series; and a projection lens. A projection-type display device of this type is referred to as a single-panel, field-sequential, or time-division projection-type display device.

Both types employ a high-luminance light source such as a high-pressure mercury lamp for a white light source. However, a high-pressure mercury lamp, while featuring high luminance, gives rise to the following problems in the projection-type display device that employs such a light source.

Due to the use of mercury, a high-pressure mercury lamp is problematic from the standpoint of the environment, and further, has the problem of short service life.

Because the conditions for stable lighting are pre-determined, dimming to any brightness is not possible. As a result, the brightness of the light source cannot be adjusted according to the conditions of use of the projection-type display device such as the brightness of the room or the magnification of the projected screen, leading to waste of consumed power.

In addition, not only is time required to reach the state of steady brightness after lighting, but after extinguishing the lamp, a waiting period is also necessary for the lamp to cool before immediate relighting, rendering use of the lamp inconvenient.

Recent years have seen the development of higher luminance of light sources referred to as solid-state light sources or semiconductor light sources such as light-emitting diodes (LEDs). A solid-state light source has longer service life than a discharge lamp and is also superior from the standpoint of the environment because mercury is not used.

When an LED is used as the light source in a projection-type display device, power can be saved accurately in accordance with conditions by installing a dimmer function for controlling the amount of current to the LED according to the conditions of use of the projection-type display device.

In addition, a projection-type display device that uses LEDs as a light source obtains a bright image immediately after lighting. Still further, a waiting period for cooling is not necessary before relighting, thereby improving convenience for the user.

Due to the many advantages of solid-state light sources described hereinabove, light source devices that use, for example, LEDs are greatly anticipated in projection-type display devices.

However, in a white LED that emits white light, a fluorescent substance that emits yellow light is excited by blue light to obtain white light by blue and yellow light.

FIG. 1 shows the emission spectrum of a white LED. The emission spectrum has, in addition to a steep peak in the blue wavelength band, a gentle peak in the yellow wavelength band that spreads to green and red. This type of white LED, while having high light-emission efficiency, has a fixed emission spectrum, and the white balance therefore cannot be adjusted. In addition, the chromaticity of white light is known to have variations due to problems arising in the fabrication of LEDs.

In the case of either a three-panel projection-type display device or a single-panel projection-type display device, a color image is basically made up of images of the three primary colors of red (R), green (G), and blue (B). In the case of a white LED, the amounts of green and red light are relatively smaller than for blue or yellow. To obtain a projected image having superior color reproducibility, luminous flux of the narrow wavelength bands of the three primary colors of red (R), green (G), and blue (B) must be extracted from the emitted luminous flux of the white LED. To this end, the luminous flux of yellow must consequently be eliminated, and further, blue luminous flux must be controlled to obtain white balance. In a case in which the color having the least amount of luminous flux is red, the green luminous flux must also be controlled. In other words, the light utilization efficiency is drastically reduced.

When white LEDs are used in interior lighting, a light source having superior color rendering can be obtained by arranging LEDs that emit red and green or blue-green that is insufficient.

In the case of a projection-type display device, however, there is the constraint of etendue that is determined by the angle of divergence and the area of the light source. If the value of the product of the angle of divergence and the area of the light source is not limited to a value no greater than the product of the area of the display element and the acceptance angle (solid angle) that is determined by the f-number of the projection lens, then the light from the light source is not used as projection light. In other words, there is a constraint upon the area of the semiconductor chips of the LEDs or the number of LEDs in the projection optics, and moreover, there is a constraint upon the angle of divergence of the illumination light. An improvement in brightness cannot be achieved even if more LEDs than the number determined by the constraints of etendue are arranged in an array.

In response, Patent Document 1 and Patent Document 2 disclose display devices in which not only brightness and color reproducibility but also white balance are improved by replacing, of the light from a white light source, the light of a specific wavelength band that is insufficient with light from another light source.

According to Patent Document 1, the amount of light of the red wavelength component of a high-pressure mercury lamp that is used as a white light source is small. In response, an LED array light source that emits red light is used in the red illumination light.

According to Patent Document 2, of the white light of a white light source, the light of the red wavelength component for which the amount of light is small is partially replaced by light from a semiconductor laser light source that emits red light using a hologram element.

The above-described prior art are examples in which high-pressure mercury lamps are used as the white light source, but these examples are similar to cases in which the high-pressure mercury lamps are replaced by white LEDs.

In this way, display devices having not only excellent brightness and color reproducibility but also superior white balance, as well, are obtained by using main illumination light and auxiliary illumination light.

As another example in which light of a plurality of colors is synthesized, Patent Document 3 discloses a mode in which the difference in polarization is used to synthesize colored light by a polarization beam splitter or a mode in which the difference in wavelengths is used to synthesize colored light by dichroic mirrors.

According to Patent Document 3, green P-polarized light and red and blue S-polarized light are synthesized by a polarization beam splitter. Alternatively, green light and red and blue light are synthesized by dichroic mirrors.

Synthesizing three different colors from two directions allows the disposition of a greater number of light sources of a color component that is insufficient for emitting white light.

LITERATURE OF THE PRIOR ART

Patent Documents

Patent Document 1: Japanese Unexamined Patent Application Publication No. 2000-305040 (FIG. 1)
Patent Document 2: Japanese Unexamined Patent Application Publication No. 2002-296680 (FIG. 1)
Patent Document 3: Japanese Unexamined Patent Application Publication No. 2006-337609 (FIG. 1)

SUMMARY OF THE INVENTION

As shown in Patent Document 1 or Patent Document 2, when auxiliary illumination light is used to augment brightness, the light utilization efficiency is not necessarily improved due to not only the non-use of the original light that was replaced, but also the occurrence of optical loss during replacement.

On the other hand, in Patent Document 3 in which the difference in polarization or wavelength is used to synthesize light, light of each of the colors is irradiated and synthesized from one direction, whereby the amount of light for augmenting an insufficient color by LEDs is limited and light cannot be augmented efficiently.

It is therefore an object of the present invention to provide: a light source device that can raise the light utilization efficiency when mixing colors and thus solve the above-described problem, and a projection-type display device that is provided with the light source device.

The light source device of the present invention for achieving the above-described object includes:

a first light source that emits light of a plurality of colors including different wavelengths of a first polarization;

a light source means that emits light of a second polarization whose polarization state differs from that of the first polarization and that includes light of at least one color among the plurality of colors; and a color synthesis means that synthesizes the light of the first polarization that is emitted from the first light source and light of the second polarization that is emitted from the light source means.

The projection-type display device of the present invention includes:

the above-described light source device;

display elements that are irradiated by light from the light source device; and projection optics that project images that are displayed on the display elements.

Another projection-type display device of the present invention includes:

the above-described light source device;

a polarization conversion means that converts, of light of the first and second polarization that is emitted from the light source device, the light of one polarization to light of the other polarization;

a color separation means that separates light of the other polarization that is exited from the polarization conversion means into red, green, and blue light;

a first display element that is irradiated by red light that was separated by the color separation means;

a second display element that is irradiated by green light that was separated by the color separation means;

a third display element that is irradiated by blue light that was separated by the color separation means; and projection optics that project images that are displayed by the first to third display elements.

BRIEF DESCRIPTION OF THE DRAWINGS

FIG. 2 is a perspective view showing the configuration of the light source device that is the first exemplary embodiment of the present invention.

FIG. 15 is a schematic view showing an example of the optical paths in which colors are synthesized in the light source device shown in FIG. 13.

FIG. 17 is a perspective view showing the configuration of the light source device that is the fourth exemplary embodiment of the present invention.

Figure 1:
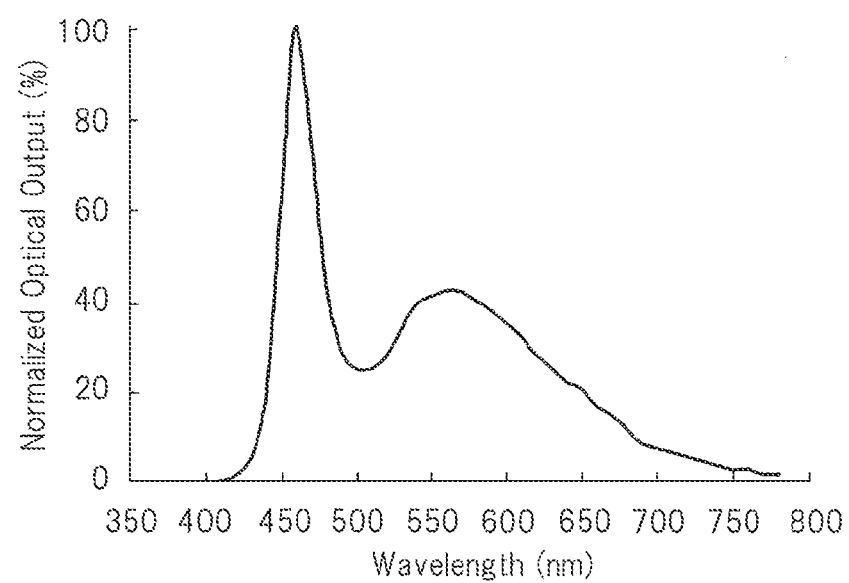
FIG. 1 is a graph showing the emission spectrum of a white LED.

EXPLANATION OF REFERENCE NUMBERS 1 first color synthesis optical element
2 first polarizing dichroic mirror
3a first light source
3b second light source

BEST MODE FOR CARRYING OUT THE INVENTION

Exemplary embodiments of the present invention are next described with reference to the accompanying drawings.

First Exemplary Embodiment

FIG. 2 is a perspective view showing the configuration of the light source device that is the first exemplary embodiment of the present invention.

Referring to FIG. 2, the light source device includes first color synthesis optical element 1, first light source 3a, and second light source 3b.

First color synthesis optical element 1 is a polarizing dichroic prism composed of two right angle prisms in which oblique sides are joined to each other. First polarizing dichroic mirror 2 composed of a dielectric multilayer film is formed on the junction surfaces of the two right angle prisms.

Of the four side surfaces of first color synthesis optical element 1, two adjacent side surfaces are incident surfaces 1a and 1b, and the side surface opposite incident surface 1a is exit surface 1c. First light source 3a is disposed to face incident surface 1a, and second light source 3b is disposed to face incident surface 1b.

First light source 3a emits white light (P-polarized light). Second light source 3b emits red light (S-polarized light). Here, white light contains at least red, green, and blue wavelength components.

The P-polarized light (white) from first light source 3a is irradiated into first color synthesis optical element 1 from incident surface 1a. The S-polarized light (red) from second light source 3b is irradiated into first color synthesis optical element 1 from incident surface 1b.

In first color synthesis optical element 1, the P-polarized light (white) irradiated from incident surface 1a and the S-polarized light (red) irradiated from incident surface 1b are synthesized by first polarizing dichroic mirror 2. The light that has been synthesized by first polarizing dichroic mirror 2 is exited from exit surface 1c.

Figure 3A:
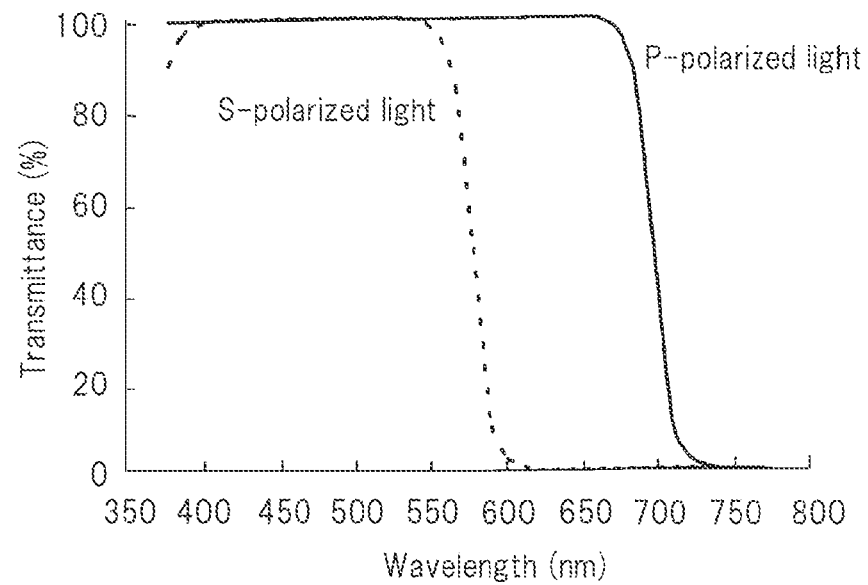
FIG. 3A is a graph showing the spectral transmittance characteristic with respect to P-polarized light and S-polarized light of the first polarizing dichroic mirror of the first color synthesis optical element shown in FIG. 2.
Figure 3B:
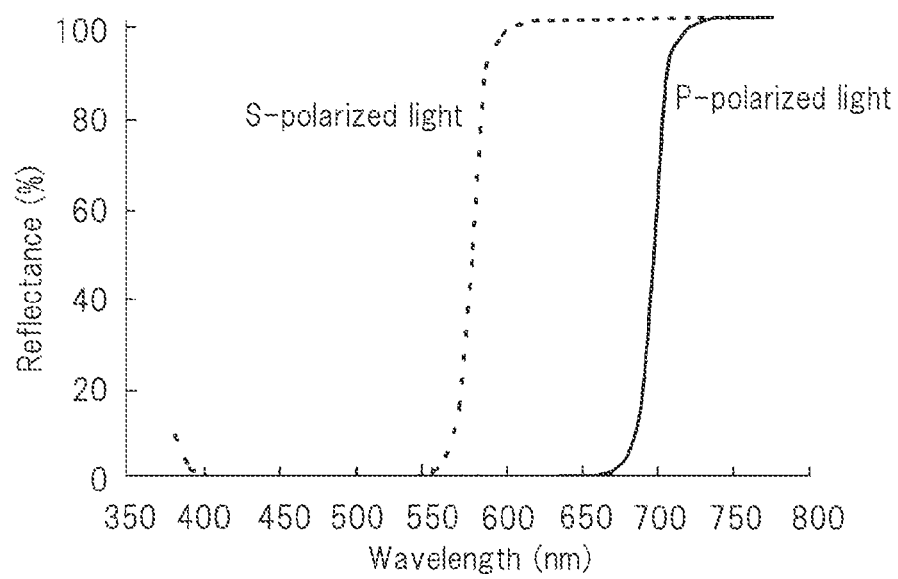
FIG. 3B is a graph showing the spectral reflectance characteristic with respect to P-polarized light and S-polarized light of the first polarizing dichroic mirror of the first color synthesis optical element shown in FIG. 2.

FIG. 3A is a graph showing the spectral transmittance characteristic with respect to P-polarized light and S-polarized light of first polarizing dichroic mirror 2. FIG. 3B is a graph showing the spectral reflectance characteristic with respect to P-polarized light and S-polarized light of first polarizing dichroic mirror 2.

The cutoff wavelength is defined as the wavelength at which transmittance or reflectance becomes 50%. The cutoff wavelength of first polarizing dichroic mirror 2 with respect to incident P-polarized light is 700 nm. In this case, first polarizing dichroic mirror 2 largely transmits and does not reflect P-polarized light having a wavelength of 700 nm or less. On the other hand, the cutoff wavelength of first polarizing dichroic mirror 2 with respect to incident S-polarized light is 580 nm. In this case, first polarizing dichroic mirror 2 largely transmits and does not reflect S-polarized light having a wavelength of 580 nm or less. In addition, first polarizing dichroic mirror 2 largely reflects and does not transmit S-polarized light having wavelengths longer than 580 nm.

If the characteristics of first polarizing dichroic mirror 2 are expressed in terms of its action upon colored light, with respect to red light, first polarizing dichroic mirror 2 transmits P-polarized light and reflects S-polarized light. In other words, first polarizing dichroic mirror 2 also acts as a polarization beam splitter with respect to red light. In addition, with respect to green and blue light, first polarizing dichroic mirror 2 transmits and does not act in any way upon P-polarized light and S-polarized light. In other words, regarding P-polarized light, first polarizing dichroic mirror 2 transmits and does not reflect red, green, and blue, i.e., white, and reflects only red S-polarized light.

First polarizing dichroic mirror 2 that thus acts as a polarization beam splitter only with respect to a specific wavelength band has the advantage of being easier to fabricate than a device that acts as a polarization beam splitter over the entire range of visible light.

Figure 4:
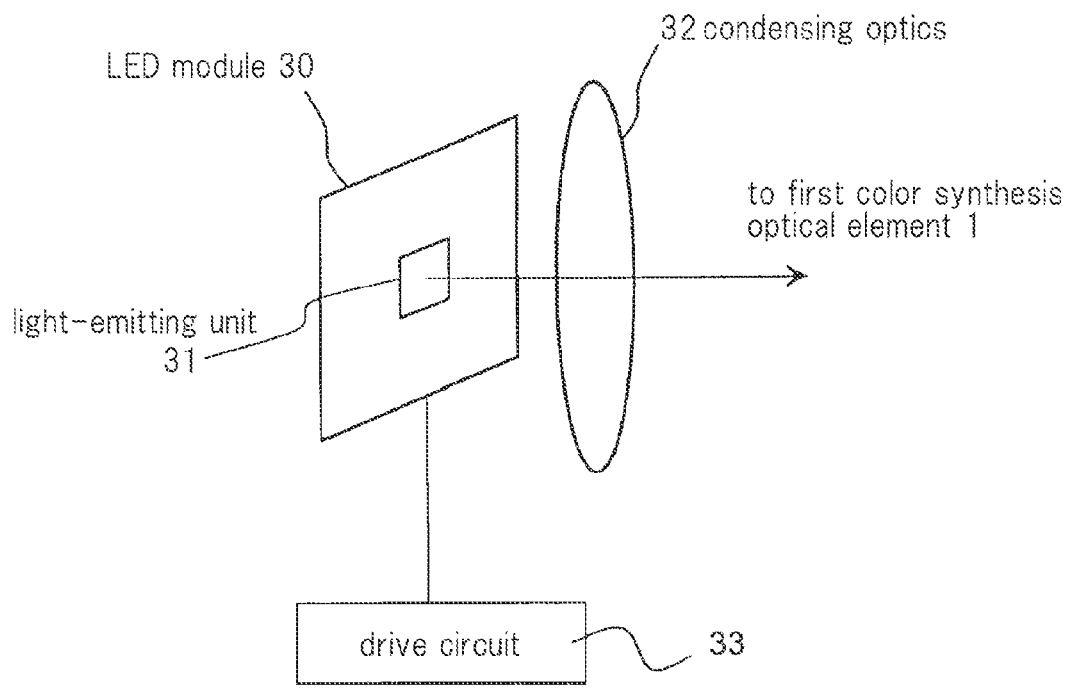
FIG. 4 is a block diagram showing the configuration of the first and second light sources shown in FIG. 2.

FIG. 4 is a block diagram showing the basic configuration of a light source that is used as first light source 3a and second light source 3b.

Referring to FIG. 4, the light source includes LED module 30 in which an LED that is light-emitting unit 31 is mounted on a substrate. The substrate is additionally provided with the function of a radiator plate and a heat sink (not shown) is attached. A forced cooling device is further provided on LED module 30 and temperature control is effected such that the light emission characteristics of the LED are stabilized.

The area of light-emitting unit 31 is basically determined by the f-number of the projection lens and the area of the display element of the projection-type display device in which the light source device of the present exemplary embodiment is installed, based on the constraints of the previously described etendue. However, when determining the area, positioning margins for fabrication and the uniformity of the illuminance distribution of illumination light are taken into consideration.

When the switch of the light source device is turned ON, drive circuit 33 supplies drive current to light-emitting unit (LED) 31. When current flows to light-emitting unit (LED) 31, light-emitting unit (LED) 31 emits light. The light from light-emitting unit (LED) 31 is condensed by condensing optics 32. The luminous flux from condensing optics 32 is irradiated into first color synthesis optical element 1.

In the example shown in FIG. 4, a lens-shaped optical element is used as condensing optics 32, but a reflective optical element such as a reflector may also be used.

In addition, a fly-eye lens or glass rod may be used as an integrator for making the illuminance distribution across the cross section of luminous flux that is irradiated into the display element uniform.

Still further, in order to obtain polarization components efficiently, optics such as polarization conversion optics that use a polarization beam splitter and a half-wave plate may be employed for re-using one polarization component.

In addition, light-emitting unit 31 of LED module 30 may be a light source that produces polarized light, or a configuration may be adopted in which light-emitting unit 31 is provided with a polarization conversion function and polarized light is produced from light-emitting unit 31.

Figure 5:
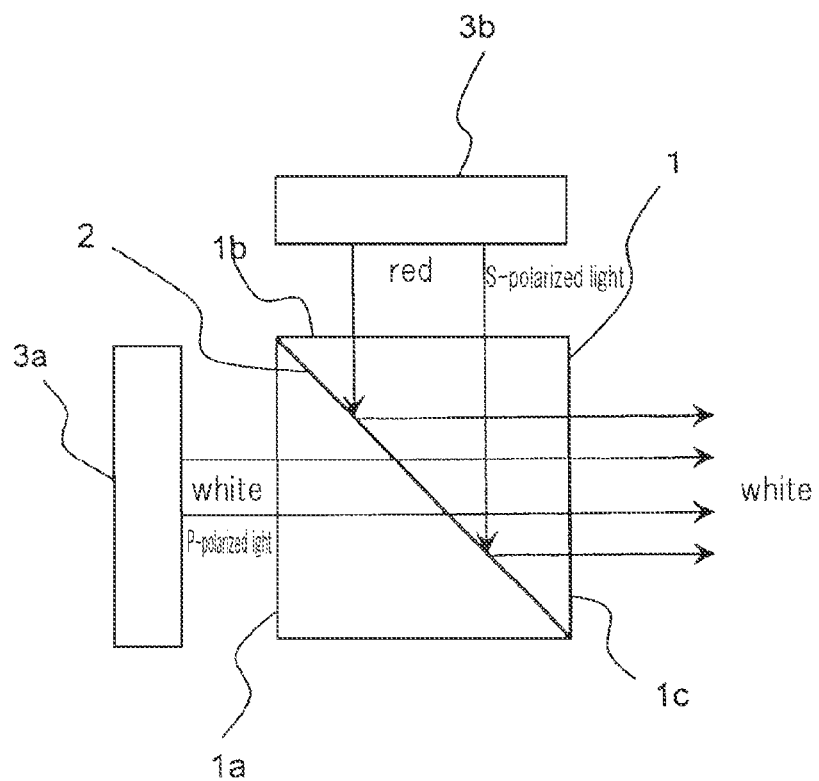
FIG. 5 is a schematic view showing an example of the optical paths in which colors are synthesized in the light source device shown in FIG. 2.

FIG. 5 is a plan view for describing the optical paths when the light source device shown in FIG. 2 is used to synthesize colored light. In FIG. 5, lines represented as solid lines with arrows show representative directions of progression of incident luminous flux. However, this does not mean that only the lines represented by solid lines with arrows are the incident light rays. The incident light is luminous flux having a cross-sectional area no greater than the incident surfaces of first color synthesis optical element 1 and contains positions other than the lines represented by solid lines with arrows as well as beams having an angular component.

The white P-polarized light from first light source 3a is irradiated to incident surface 1a of first color synthesis optical element 1. First polarizing dichroic mirror 2 does not act in any way upon white P-polarized light. As a result, white P-polarized light passes through first polarizing dichroic mirror 2 without alteration as shown in FIG. 5.

On the other hand, red S-polarized light from second light source 3b is irradiated to incident surface 1b of first color synthesis optical element 1. First polarizing dichroic mirror 2 reflects all red S-polarized light. As a result, the luminous flux of red S-polarized light is bent 90° by first polarizing dichroic mirror 2 and is then exited from exit surface 1c, as shown in FIG. 5.

As described above, in the light source device of the present exemplary embodiment, white P-polarized light irradiated from incident surface 1a and red S-polarized light irradiated from incident surface 1b are synthesized by first polarizing dichroic mirror 2, whereby white light augmented by red can be obtained.

Figure 6A:
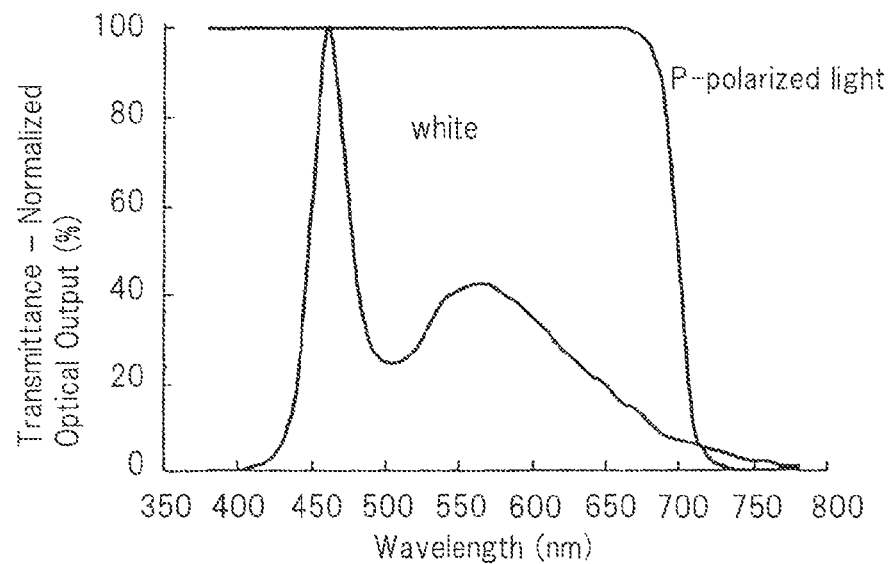
FIG. 6A is a graph showing the relation between the emission spectrum of a white LED and the spectral transmittance characteristic with respect to P-polarized light of the first polarizing dichroic mirror of the first color synthesis optical element shown in FIG. 2.

FIG. 6A is a graph showing the relation between the emission spectrum of a white LED and the spectral transmittance characteristic with respect to P-polarized light of first polarizing dichroic mirror 2. The emission spectrum of the white LED has a steep peak at a wavelength of 460 nm in the blue wavelength band and a gentle peak at a wavelength of 565 nm in the yellow wavelength band.

Figure 6B:
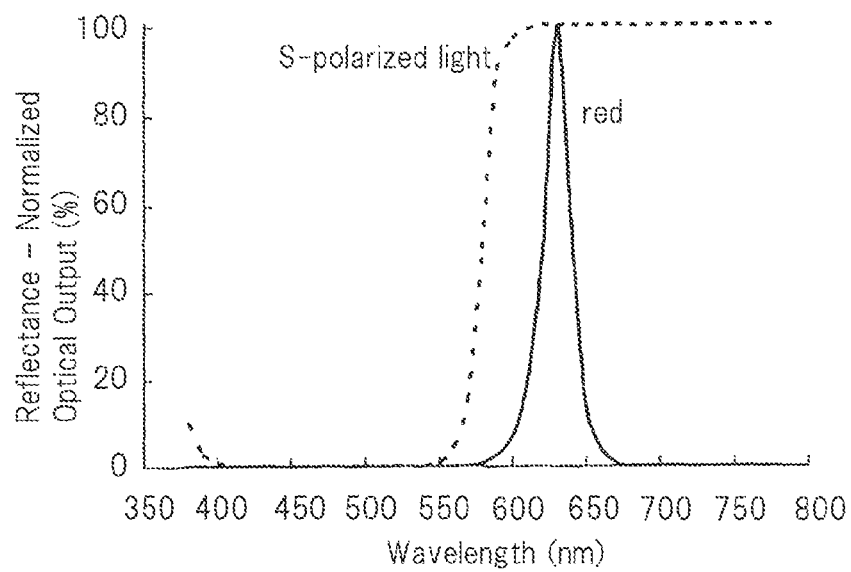
FIG. 6B is a graph showing the relation between the emission spectrum of a red LED and the spectral reflectance characteristic with respect to S-polarized light of the first polarizing dichroic mirror of the first color synthesis optical element shown in FIG. 2.

FIG. 6B is a graph showing the relation between the emission spectrum of a red LED and the spectral reflectance characteristic with respect to S-polarized light of first polarizing dichroic mirror 2. The peak wavelength of the red LED is 630 nm.

As is clear from FIGS. 6A and 6B, colored light can be synthesized efficiently because white and red light are synthesized from different directions at different polarizations. In other words, optical loss does not occur because the light of the red LED is added to the light of the white LED instead of replacing the red component that is insufficient in a white LED with light of a red LED.

The amount of light of the red LED can be adjusted independently from the amount of light of the white LED. Accordingly, the present exemplary embodiment can provide a light source device that has high light utilization efficiency when mixing colors and that enables adjustment of white balance.

Second Exemplary Embodiment

Figure 7:
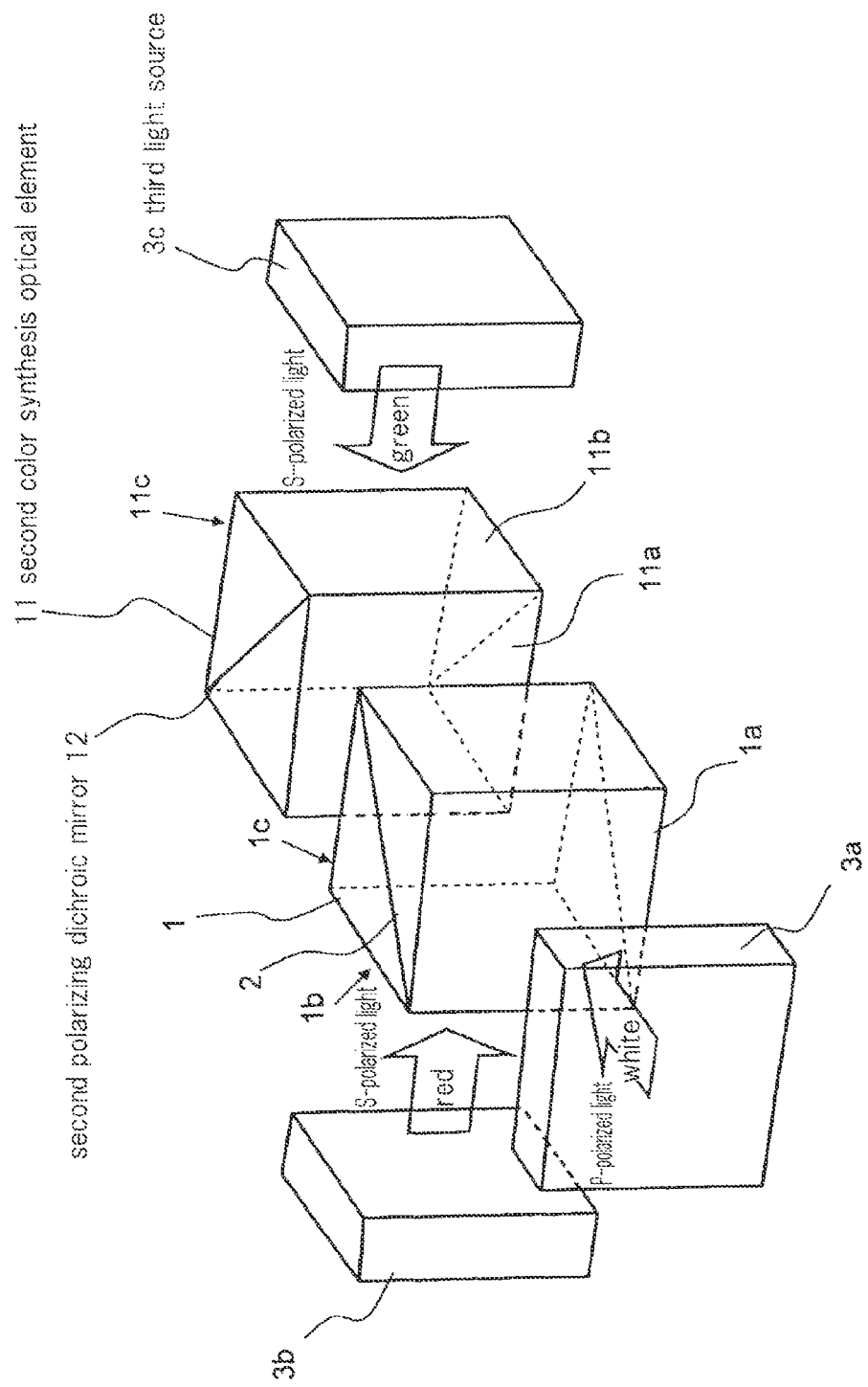
FIG. 7 is a perspective view showing the configuration of the light source device that is the second exemplary embodiment of the present invention.

FIG. 7 is a perspective view showing the configuration of the light source device that is the second exemplary embodiment of the present invention.

Referring to FIG. 7, the light source device includes first color synthesis optical element 1, second color synthesis optical element 11, first light source 3*a*, second light source 3*b*, and third light source 3*c*. First color synthesis optical element 1, first light source 3*a*, and second light source 3*b* are the same as the components shown in FIG. 2. Second color synthesis optical element 11 is arranged in the direction of progression of light that is exited from exit surface 1*c* of first color synthesis optical element 1.

Second color synthesis optical element 11 is a polarizing dichroic prism composed of two right angle prisms in which the oblique sides are joined together. Second polarizing dichroic mirror 12 composed of a dielectric multilayer film is formed on the junction surfaces of the two right angle prisms.

Of the four side surfaces of second color synthesis optical element 11, two adjacent side surfaces are incident surfaces 11*a* and 11*b*, and the side surface that is opposite incident surface 11*a* is exit surface 11*c*. Second color synthesis optical element 11 is arranged such that incident surface 11*a* faces exit surface 1*c* of first color synthesis optical element 1. Third light source 3*c* is arranged to face incident surface 11*b*.

In first color synthesis optical element 1, white light (P-polarized light) from first light source 3*a* and red light (S-polarized light) from second light source 3*b* are synthesized, and this synthesized light is exited from exit surface 1*c*. The light that is exited from this exit surface 1*c* is irradiated into incident surface 11*a* of second color synthesis optical element 11.

Third light source 3*c* emits green light (S-polarized light). The S-polarized light (green) from third light source 3*c* is irradiated into second color synthesis optical element 11 from incident surface 11*b*.

In second color synthesis optical element 11, the P-polarized light (white) and S-polarized light (red) that are irradiated from incident surface 11*a* and the S-polarized light (green) that is irradiated from incident surface 11*b* are synthesized by second polarizing dichroic mirror 12. The light that has been synthesized by second polarizing dichroic mirror 12 is exited from exit surface 11*c*.

Figure 8A:
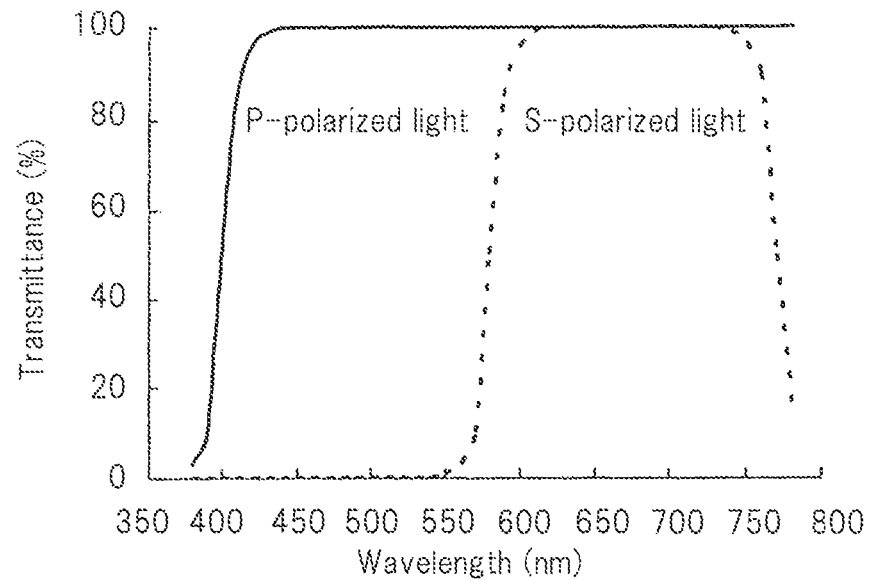
FIG. 8A is a graph showing the spectral transmittance characteristic with respect to P-polarized light and S-polarized light of the second polarizing dichroic mirror of the second color synthesis optical element shown in FIG. 7.
Figure 8B:
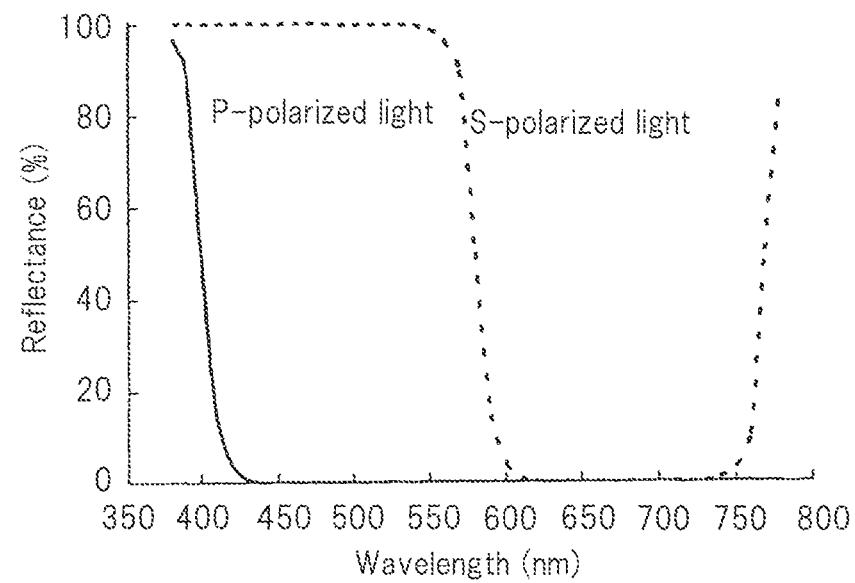
FIG. 8B is a graph showing the spectral reflectance characteristic with respect to P-polarized light and S-polarized light of the second polarizing dichroic mirror of the second color synthesis optical element shown in FIG. 7.

FIG. 8A is a graph showing the spectral transmittance characteristic with respect to P-polarized light and S-polarized light of second polarizing dichroic mirror 12. FIG. 8B is a graph showing the spectral reflectance characteristic with respect to P-polarized light and S-polarized light of second polarizing dichroic mirror 12.

The cutoff wavelength of second polarizing dichroic mirror 12 with respect to incident P-polarized light is 400 nm. In this case, second polarizing dichroic mirror 12 largely transmits and does not reflect P-polarized light having a wavelength of 400 nm or more. On the other hand, the cutoff wavelength of second polarizing dichroic mirror 12 with respect to incident S-polarized light is 580 nm. In this case, second polarizing dichroic mirror 12 largely transmits and does not reflect S-polarized light having a wavelength of 580 nm or more. In addition, second polarizing dichroic mirror 12 largely reflects and does not transmit S-polarized light having wavelengths shorter than 580 nm.

If the characteristics of second polarizing dichroic mirror 12 are expressed in terms of its action upon colored light, with respect to green or blue light, second polarizing dichroic mirror 12 transmits P-polarized light and reflects S-polarized light. In other words, second polarizing dichroic mirror 12 also acts as a polarization beam splitter with respect to green or blue light.

With respect to red light, second polarizing dichroic mirror 12 does not act in any way and transmits both P-polarized light and S-polarized light. In other words, regarding P-polarized light, second polarizing dichroic mirror 12 transmits and does not reflect red, green, and blue, i.e., white. Regarding S-polarized light, on the other hand, second polarizing dichroic mirror 12 transmits red but reflects green or blue.

A light source having the basic construction shown in FIG. 4 can be used as light source 3*c*.

Figure 9:
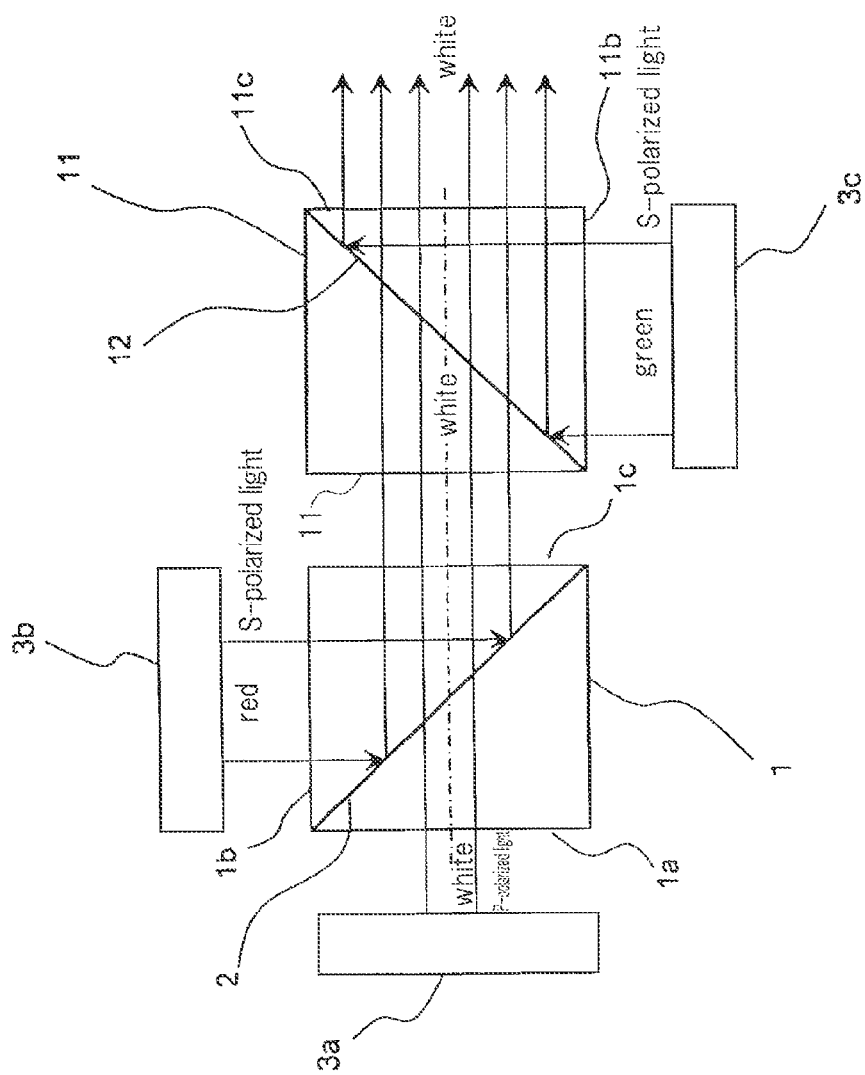
FIG. 9 is a schematic view showing an example of the optical paths in which colors are synthesized in the light source device shown in FIG. 7.

FIG. 9 is a plan view for describing the optical paths when using the light source device shown in FIG. 7 to synthesize colored light. In FIG. 9, lines represented as solid lines with arrows indicate representative directions of progression of incident luminous flux. However, this does not mean that only the lines represented by solid lines with arrows are the incident light rays. The incident light is luminous flux having a cross-sectional area no greater than the incident surfaces of each of color synthesis optical elements 1 and 11 and includes positions other than the lines represented by solid lines with arrows as well as light rays having an angular component.

The optical paths when colored light is synthesized in first color synthesis optical element 1 are as shown in FIG. 5. The P-polarized light (white) and S-polarized light (red) exited from exit surface 1*c* of first color synthesis optical element 1 are irradiated into second color synthesis optical element 11. Second polarizing dichroic mirror 12 does not act in any way upon white P-polarized light and red S-polarized light. Accordingly, white P-polarized light and red S-polarized light pass through second polarizing dichroic mirror 12 without alteration, as shown in FIG. 9.

Green S-polarized light from third light source 3*c* is irradiated into incident surface 11*b* of second color synthesis optical element 11. Second polarizing dichroic mirror 12 reflects all green S-polarized light. Accordingly, the luminous flux of green S-polarized light is bent 90° by second polarizing dichroic mirror 12 and then exited from exit surface 11*c*, as shown in FIG. 9.

As described hereinabove, in the light source device of the present exemplary embodiment, white P-polarized light from first light source 3*a* and red S-polarized light from second light source 3b are synthesized by first color synthesis optical element 1, and the white P-polarized light and red S-polarized light that are exited from this color synthesis optical element 1 and the green S-polarized light from third light source 3c are synthesized by second color synthesis optical element 11. White light that has been augmented by red and green can thus be obtained.

Figure 10A:
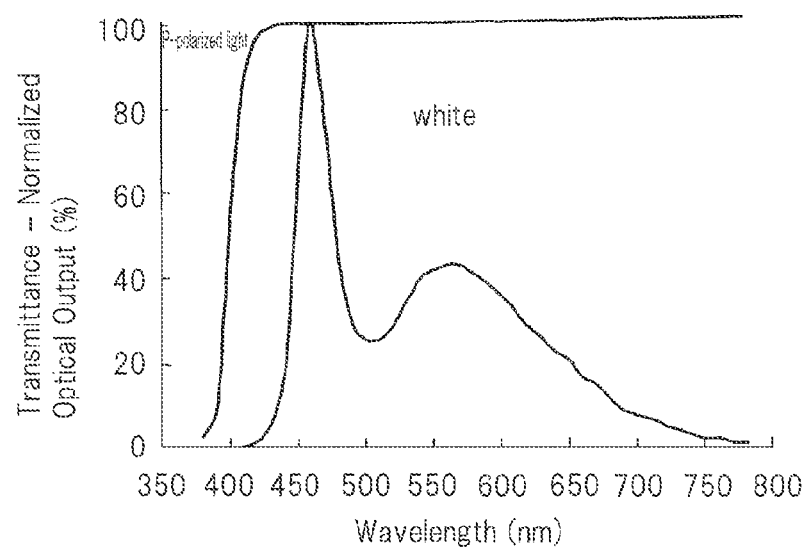
FIG. 10A is a graph showing the relation between the emission spectrum of a white LED and the spectral transmittance characteristic with respect to P-polarized light of the second polarizing dichroic mirror of the second color synthesis optical element shown in FIG. 7.

FIG. 10A is a graph showing the relation between the emission spectrum of a white LED and the spectral transmittance characteristic with respect to P-polarized light of second polarizing dichroic mirror 12. The emission spectrum of a white LED has a steep peak of a wavelength of 460 nm in the blue wavelength band and a gentle peak of wavelength 565 nm in the yellow wavelength band.

Figure 10B:
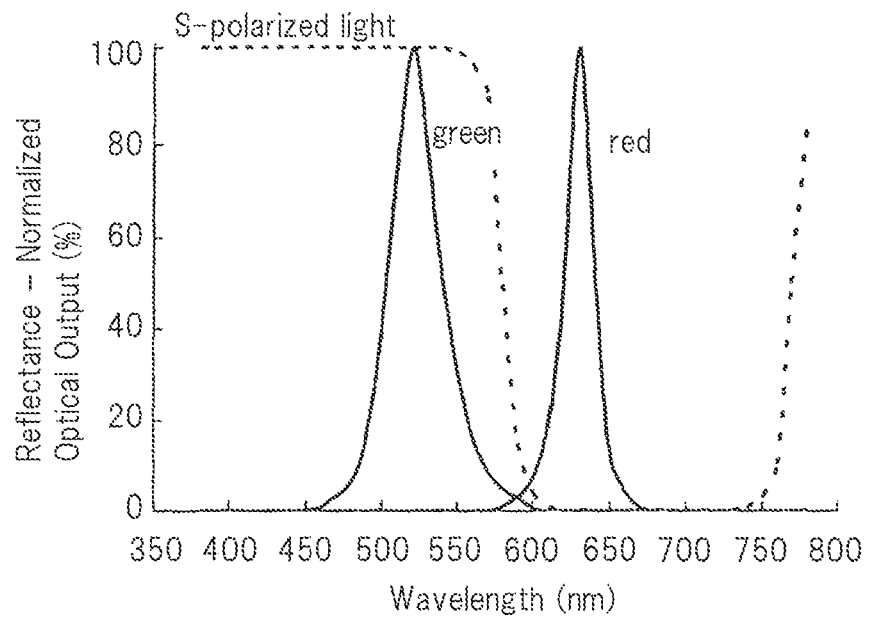
FIG. 10B is a graph showing the relation between the emission spectrums of each of red and green LEDs and the spectral reflectance characteristic with respect to S-polarized light of the second polarizing dichroic mirror of the second color synthesis optical element shown in FIG. 7.

FIG. 10B is a graph showing the relation between the emission spectrums of a red LED and green LED and the spectral reflectance characteristic with respect to S-polarized light of second polarizing dichroic mirror 12. The peak wavelength of the red LED is 630 nm, and the peak wavelength of the green LED is 530 nm.

As is clear from FIGS. 10A and 10B, white, red, and green light from different directions and at different polarizations are synthesized, whereby colored light can be synthesized efficiently. In other words, optical loss does not occur because, instead of replacing the red and green components that are insufficient in a white LED with the light of a red LED and the light of green LED, the light of a red LED and the light of a green LED are added to the light of the white LED.

The amount of light of the red LED and green LED can be adjusted independently from the amount of light of the white LED. Accordingly, the present exemplary embodiment is able to provide a light source device that has high light utilization efficiency when mixing colors and that enables adjustment of white balance.

In the light source device of the present exemplary embodiment, third light source 3c is not limited to a configuration that emits green S-polarized light and may be configured to emit S-polarized light of green and another color (for example, blue). An even higher degree of flexibility for adjusting the white balance can be achieved by emitting blue S-polarized light in addition to green.

Figure 11:
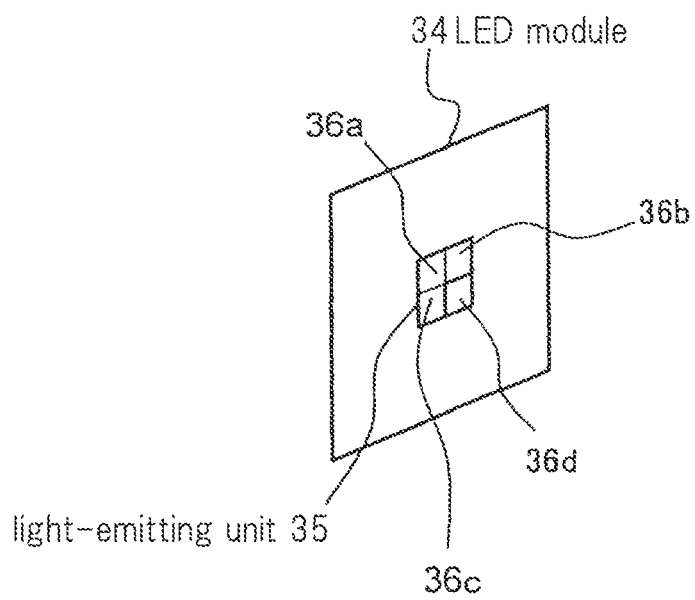
FIG. 11 is a schematic view showing the configuration of the LED module that is used as the third light source of the light source device shown in FIG. 7.

FIG. 11 is a schematic view showing the configuration of the LED module that is used as third light source 3c.

Referring to FIG. 11, LED module 34 has light-emitting unit 35 composed of four LED chips 36a-36d. All of LED chips 36a-36c are composed of green LEDs in which the peak wavelength is 530 nm. LED chip 36d is composed of a blue LED in which the peak wavelength is 460 nm. The chip areas of LED chips 36a-36d are substantially equal.

The area of light-emitting unit 35 is basically determined by the f-number of the projection lens and the area of the display elements of the projection-type display device in which the light source device of the present exemplary embodiment is installed based on the previously described constraints of etendue. However, when determining area, factors such as the positioning margins for fabrication and the uniformity of the illuminance distribution of the illumination light are taken into consideration.

As shown in FIG. 8B, regarding green or blue light, second polarizing dichroic mirror 12 transmits P-polarized light and reflects S-polarized light. Accordingly, when blue (S-polarized light) light is irradiated into second color synthesis optical element 11 by the same optical paths as the optical path of green (S-polarized light) in FIG. 9, the white P-polarized light and red S-polarized light that are exited from first color synthesis optical element 1 and the green and blue S-polarized light from that are emitted third light source 3c are synthesized by second color synthesis optical element 11. White light can thus be obtained that is augmented by red, green, and blue.

Figure 12A:
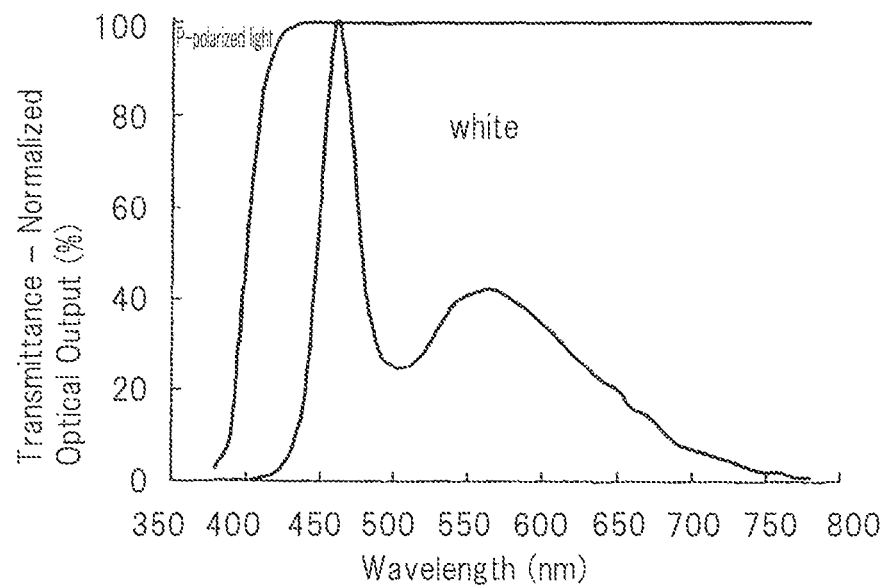
FIG. 12A is a graph showing the relation between the emission spectrum of a white LED and the spectral transmittance characteristic with respect to P-polarized light of the second polarizing dichroic mirror of the second color synthesis optical element shown in FIG. 7.

FIG. 12A is a graph showing the relation between the emission spectrum of a white LED and the spectral transmittance characteristic with respect to P-polarized light of second polarizing dichroic mirror 12. The emission spectrum of the white LED has a steep peak at wavelength 460 nm in the blue wavelength band and a gentle peak of wavelength 565 nm in the yellow wavelength band.

Figure 12B:
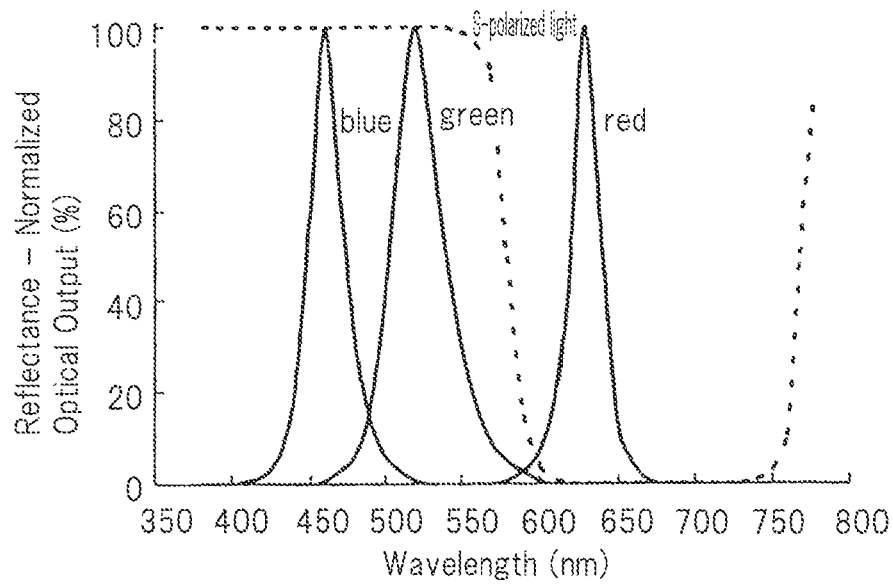
FIG. 12B is a graph showing the relation between the emission spectrums of each of red, green, and blue LEDs and the spectral reflectance characteristic with respect to S-polarized light of the second polarizing dichroic mirror of the second color synthesis optical element shown in FIG. 7.

FIG. 12B is a graph showing the relation between the emission spectrums of each of red, green, and blue LEDs and the spectral reflectance characteristic with respect to S-polarized light of second polarizing dichroic mirror 12. The peak wavelength of the red LED is 630 nm, the peak wavelength of the green LED is 530 nm, and the peak wavelength of the blue LED is 460 nm.

As is clear from FIGS. 12A and 12B, white, red, green, and blue light from different directions and at different polarizations are synthesized, whereby colored light can be synthesized efficiently. In other words, optical loss does not occur because, instead of replacing the red and green components that are insufficient in a white LED with the light of a red LED and a green LED, the light of a red LED and the light of a green LED are added to the light of the white LED. The light of a blue LED can further be added, and in this case as well, optical loss does not occur.

The amount of light of the red LED, green LED, and blue LED can be adjusted independently of the amount of light of the white LED. Accordingly, light utilization efficiency during color mixing is high and an even higher degree of flexibility can be achieved in adjusting white balance.

Third Exemplary Embodiment

Figure 13:
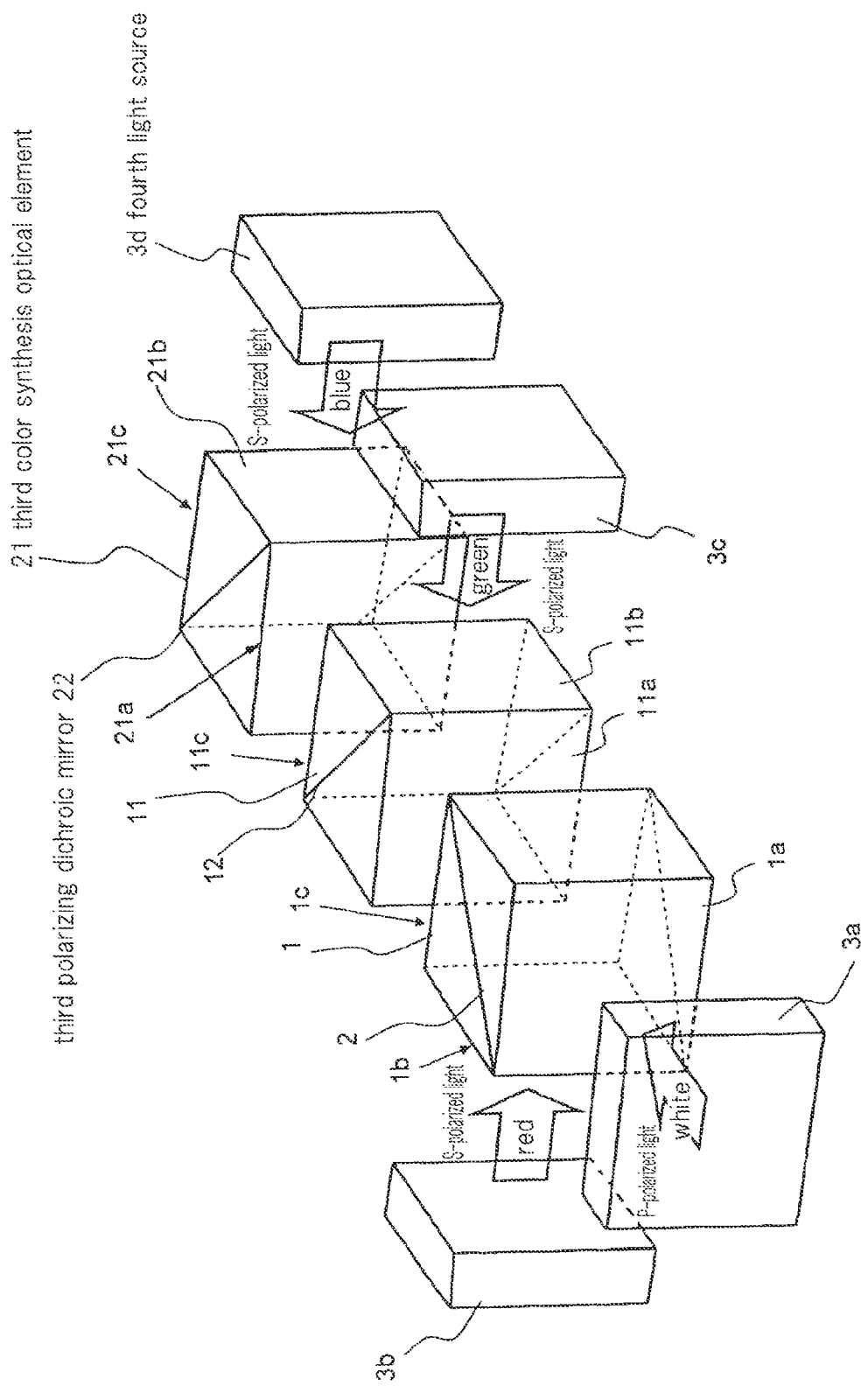
FIG. 13 is a schematic view showing the configuration of the light source device that is the third exemplary embodiment of the present invention.

FIG. 13 is a perspective view showing the configuration of the light source device that is the third exemplary embodiment of the present invention.

Referring to FIG. 13, the light source device includes first color synthesis optical element 1, second color synthesis optical element 11, third color synthesis optical element 21, first light source 3a, second light source 3b, third light source 3c, and fourth light source 3d.

First color synthesis optical element 1, second color synthesis optical element 11, first light source 3a, second light source 3b, and the third light source are identical to the elements shown in FIG. 7. Third color synthesis optical element 21 is arranged in the direction of progression of light that is exited from exit surface 11c of second color synthesis optical element 11.

Third color synthesis optical element 21, similar to first color synthesis optical element 1 and second color synthesis optical element 11, is a polarizing dichroic prism composed of two right angle prisms in which the oblique sides are joined together. Third polarizing dichroic mirror 22 composed of a dielectric multilayer film is formed on the junction surfaces of the two right angle prisms.

Of the four side surfaces of third color synthesis optical element 21, two adjacent side surfaces are incident surfaces 21a and 21b, and the side surface that is opposite incident surface 21a is exit surface 21c. Third color synthesis optical element 21 is arranged such that incident surface 21a faces exit surface 11c of second color synthesis optical element 11. Fourth light source 3d is arranged to face incident surface 21b.

The light realized by synthesizing the white light (P-polarized light) from first light source 3a, the red light (S-polarized light) from second light source 3b, and green light (S-polarized light) from third light source 3c is exited from exit surface 11c of second color synthesis optical element 11. This light that is exited from exit surface 11c is irradiated into incident surface 21a of third color synthesis optical element 21.

Fourth light source 3d emits blue light (S-polarized light). The S-polarized light (blue) from fourth light source 3d is irradiated into third color synthesis optical element 21 from incident surface 21b.

In third color synthesis optical element 21, the P-polarized light (white), S-polarized light (red), and S-polarized light (green) that are irradiated from incident surface 21a and the S-polarized light (blue) that is irradiated from incident surface 21b are synthesized by third polarizing dichroic mirror 22. The light that has been synthesized by third polarizing dichroic mirror 22 is exited from exit surface 21c.

Figure 14A:
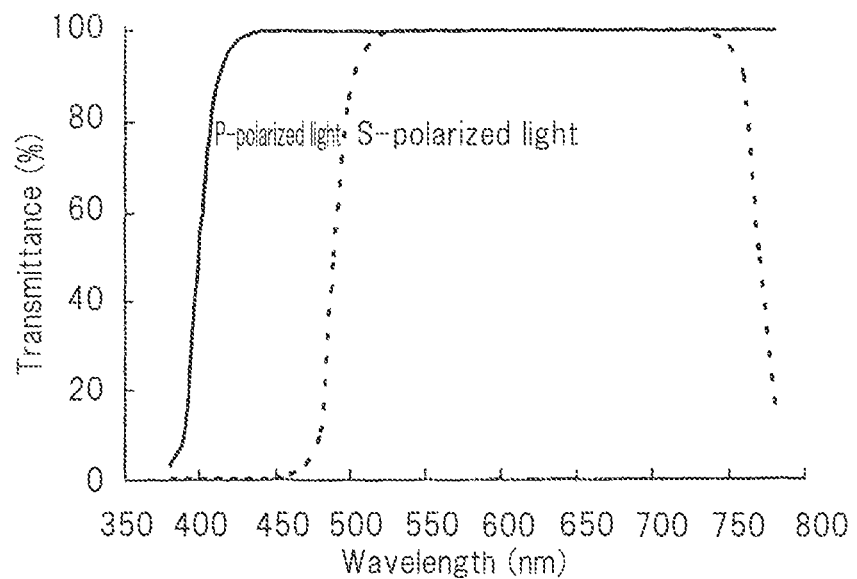
FIG. 14A is a graph showing the spectral transmittance characteristic with respect to P-polarized light and S-polarized light of the third polarizing dichroic mirror of the third color synthesis optical element shown in FIG. 13.
Figure 14B:
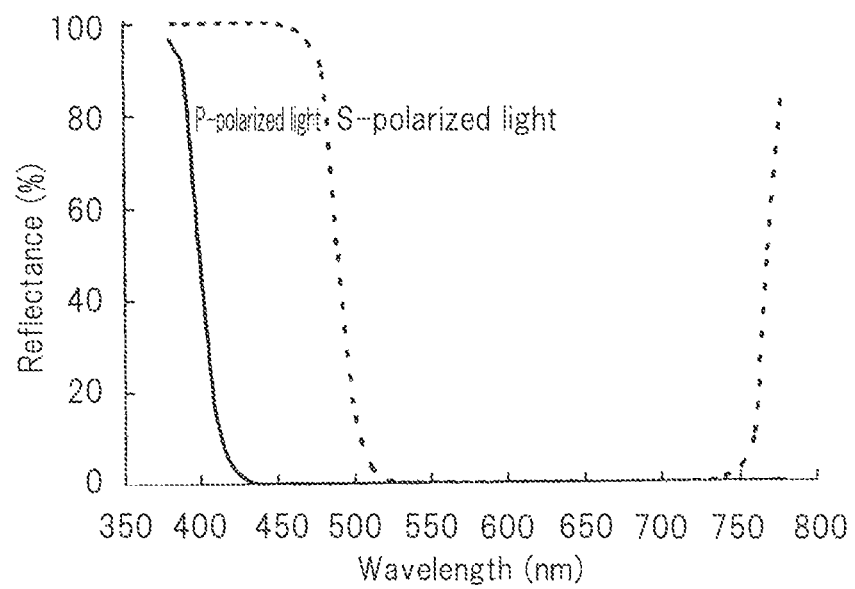
FIG. 14B is a graph showing the spectral reflectance characteristic with respect to P-polarized light and S-polarized light of the third polarizing dichroic mirror of the third color synthesis optical element shown in FIG. 13.

FIG. 14A is a graph showing the spectral transmittance characteristic with respect to P-polarized light and S-polarized light of third polarizing dichroic mirror 22. FIG. 14B is a graph showing the spectral reflectance characteristic with respect to P-polarized light and S-polarized light of third polarizing dichroic mirror 22.

The cutoff wavelength of third polarizing dichroic mirror 22 with respect to incident P-polarized light is 400 nm. In this case, third polarizing dichroic mirror 22 largely transmits and does not reflect P-polarized light having a wavelength of 400 nm or more.

On the other hand, the cutoff wavelength of third polarizing dichroic mirror 22 with respect to incident S-polarized light is 490 nm. In this case, third polarizing dichroic mirror 22 largely transmits and does not reflect S-polarized light having a wavelength of 490 nm or more. In addition, third polarizing dichroic mirror 22 largely reflects and does not transmit S-polarized light having wavelengths shorter than 490 nm.

If the characteristics of third polarizing dichroic mirror 22 are expressed in terms of its action upon colored light, with respect to blue light, third polarizing dichroic mirror 22 transmits P-polarized light and reflects S-polarized light. In other words, third polarizing dichroic mirror 22 also acts as a polarization beam splitter with respect to blue light.

In addition, with respect to red and green light, third polarizing dichroic mirror 22 transmits and does not act in any way upon both P-polarized light and S-polarized light. In other words, regarding P-polarized light, third polarizing dichroic mirror 22 transmits and does not reflect red, green, and blue, i.e., white. Regarding S-polarized light, on the other hand, third polarizing dichroic mirror 22 transmits red and green but reflects blue.

A light source having the basic configuration shown in FIG. 4 can be used as fourth light source 3d.

FIG. 15 is a plan view for describing the optical paths when the light source device shown in FIG. 13 is used to synthesize colored light. In FIG. 15, lines represented as solid lines with arrows indicate representative directions of progression of incident luminous flux. However, this does not mean that only lines represented as solid lines with arrows are the incident rays. The incident light is luminous flux having a cross-sectional area no greater than the incident surfaces of each of color synthesis optical elements 1, 11, and 21 and includes positions other than the lines represented as solid lines with arrows as well as rays having an angular component.

The optical paths when colored light is synthesized in first color synthesis optical element 1 and second color synthesis optical element 11 are as shown in FIG. 9. The P-polarized light (white), S-polarized light (red), and S-polarized light (green) that are exited from exit surface 11c of second color synthesis optical element 11 are irradiated into incident surface 21a of third color synthesis optical element 21.

Third polarizing dichroic mirror 22 does not act in any way upon white P-polarized light and red and green S-polarized light, and the white P-polarized light and red and green S-polarized light therefore pass through third polarizing dichroic mirror 22 without alteration.

The blue S-polarized light from fourth light source 3d is irradiated to incident surface 21b of third color synthesis optical element 21. Third polarizing dichroic mirror 22 reflects all blue S-polarized light. As a result, the luminous flux of the blue S-polarized light is bent 90° by third polarizing dichroic mirror 22 and then exited from exit surface 21c, as shown in FIG. 15.

As described hereinabove, in the light source device of the present exemplary embodiment, white light that is augmented by red, green, and blue can be obtained by synthesizing white P-polarized light and red and green S-polarized light that are irradiated from incident surface 21a and blue S-polarized light that is irradiated from incident surface 21b by means of third polarizing dichroic mirror 22 in third color synthesis optical element 21.

Figure 16A:
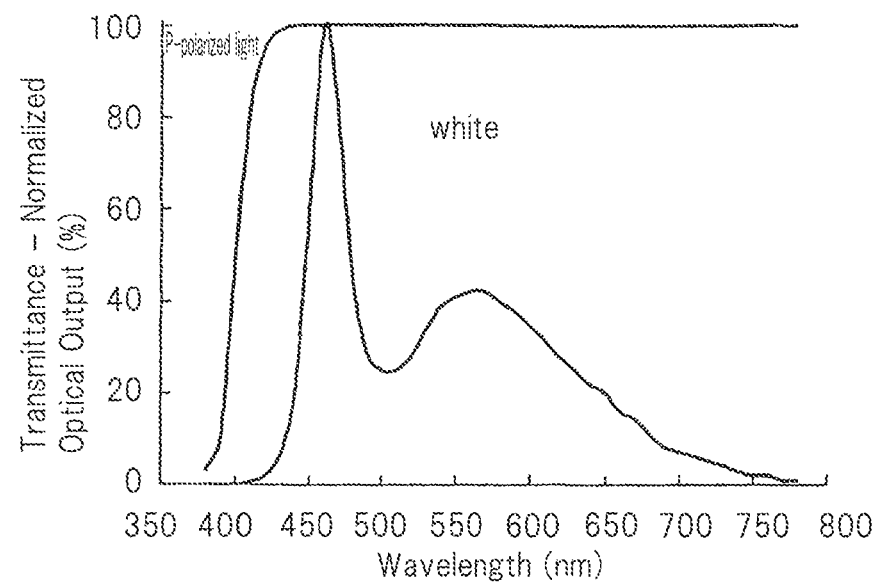
FIG. 16A is a graph showing the relation between the emission spectrum of a white LED and the spectral transmittance characteristic with respect to P-polarized light of the third polarizing dichroic mirror of the third color synthesis optical element shown in FIG. 13.

FIG. 16A is a graph showing the relation between the emission spectrum of a white LED and the spectral transmittance characteristic with respect to P-polarized light of third polarizing dichroic mirror 22. The emission spectrum of the white LED has a steep peak at a wavelength of 460 nm in the blue wavelength band and a gentle peak at a wavelength of 565 nm in the yellow wavelength band.

Figure 16B:
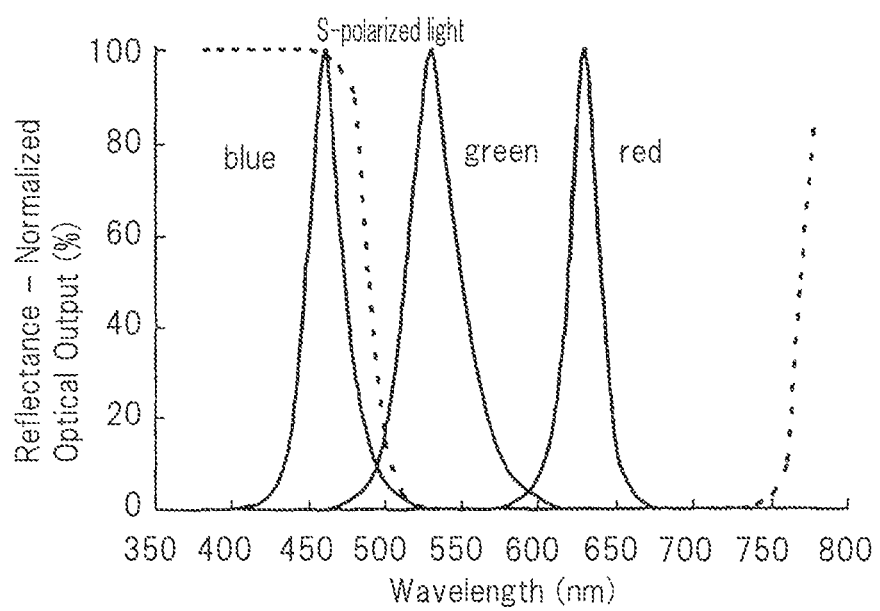
FIG. 16B is a graph showing the relation between the emission spectrums of each of red, green, and blue LEDs and the spectral reflectance characteristic with respect to S-polarized light of the third polarizing dichroic mirror of the third color synthesis optical element shown in FIG. 13.

FIG. 16B is a graph showing the relation between the emission spectrums of each of red, green, and blue LEDs and the spectral reflectance characteristic with respect to S-polarized light of third polarizing dichroic mirror 22. The peak wavelength of the red LED is 630 nm, the peak wavelength of the green LED is 530 nm, and the peak wavelength of the blue LED is 460 nm.

As is clear from FIGS. 16A and 16B, white, red, green, and blue light is synthesized from different directions and at different polarizations, whereby colored light can be synthesized efficiently. In other words, optical loss does not occur because, rather than replacing red and green components that are insufficient in a white LED with the light of a red LED and a green LED, the light of a red LED and the light of a green LED are added to the light of the white LED. Still further, the light of a blue LED can be added, and in this case as well, optical loss does not occur.

The amount of light of the red LED, green LED, and blue LED can be adjusted independently of the amount of light of the white LED. Accordingly, the present exemplary embodiment provides a light source device having high light utilization efficiency when mixing colors and an even greater degree of flexibility in adjusting white balance.

Fourth Exemplary Embodiment

FIG. 17 is a perspective view showing the configuration of the light source device that is the fourth exemplary embodiment of the present invention.

Referring to FIG. 17, the light source device includes first color synthesis optical element 41, first light source 43a, and second light source 43b.

First color synthesis optical element 41, similar to previously described color synthesis optical elements 1, 11, and 21, is a polarizing dichroic prism composed of two right angle prisms in which the oblique sides are joined together. First polarizing dichroic mirror 42 composed of a dielectric multilayer film is formed on the junction surfaces of the two right angle prisms.

Of the four side surfaces of first color synthesis optical element 41, two adjacent side surfaces are incident surfaces 41a and 41b, and side surface opposite incident surface 41a is exit surface 41c. First light source 43a is arranged to face incident surface 41a, and second light source 43b is arranged to face incident surface 41b.

First light source 43a is similar to first light source 3a shown in FIG. 2 and emits white light (P-polarized light). The white light (P-polarized light) from first light source 43a is irradiated into first color synthesis optical element 41 from incident surface 41a. In this case, the white light (P-polarized light) includes at least red, green, and blue wavelength components.

Second light source 43b emits red and green light (S-polarized light). The red and green light (S-polarized light) from second light source 43b is irradiated into first color synthesis optical element 41 from incident surface 41b.

In first color synthesis optical element 41, P-polarized light (white) that is irradiated from incident surface 41a and S-polarized light (red and green) that is irradiated from incident surface 41b are synthesized by means of first polarizing dichroic mirror 42. The light that has been synthesized by first polarizing dichroic mirror 42 is exited from exit surface 41c.

Figure 18A:
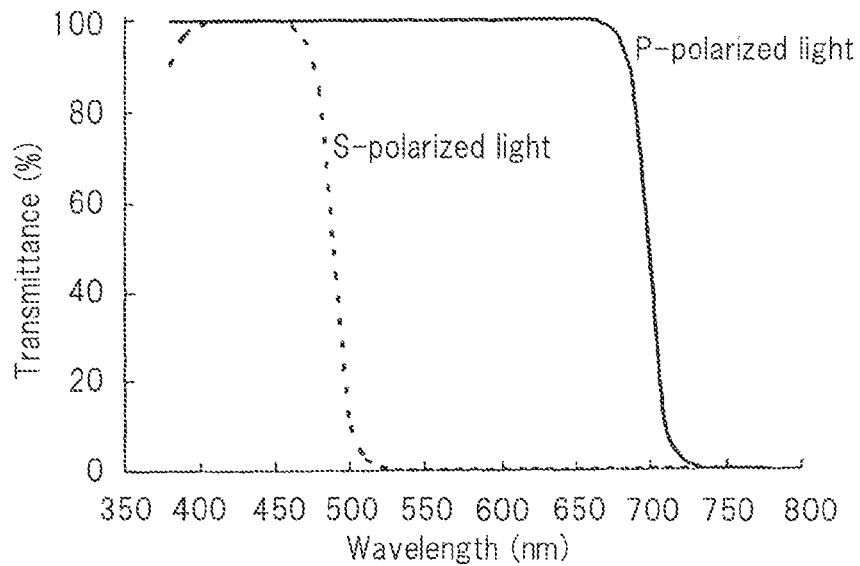
FIG. 18A is a graph showing the spectral transmittance characteristic with respect to P-polarized light and S-polarized light of the first polarizing dichroic mirror of the first color synthesis optical element shown in FIG. 17.
Figure 18B:
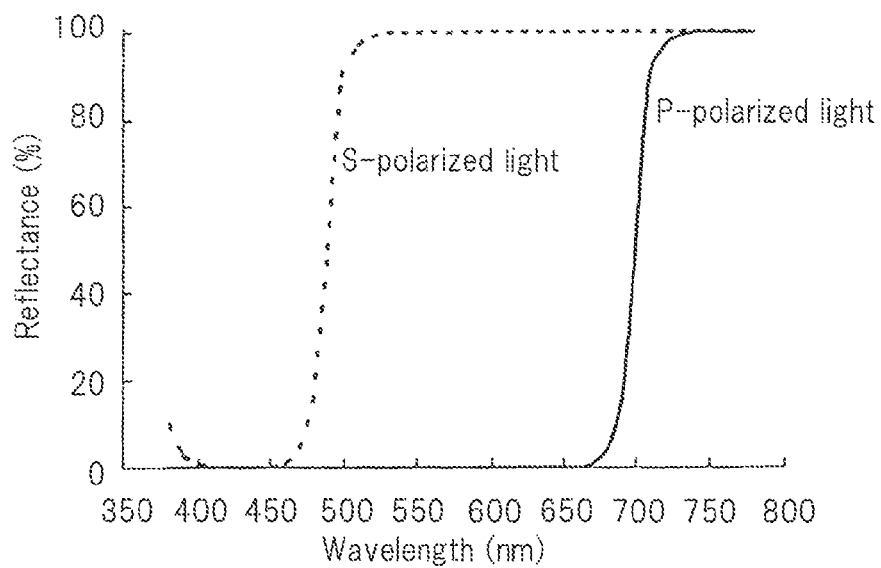
FIG. 18B is a graph showing the spectral reflectance characteristic with respect to P-polarized light and S-polarized light of the first polarizing dichroic mirror of the first color synthesis optical element shown in FIG. 17.

FIG. 18A is a graph showing the spectral transmittance characteristic with respect to P-polarized light and S-polarized light of first polarizing dichroic mirror 42. FIG. 18B is a graph showing the spectral reflectance characteristic with respect to P-polarized light and S-polarized light of first polarizing dichroic mirror 42.

The cutoff wavelength of first polarizing dichroic mirror 42 with respect to incident P-polarized light is 700 nm. In this case, first polarizing dichroic mirror 42 largely transmits and does not reflect P-polarized light having a wavelength of 700 nm or less.

On the other hand, the cutoff wavelength of first polarizing dichroic mirror 42 with respect to incident S-polarized light is 490 nm. In this case, first polarizing dichroic mirror 42 largely transmits and does not reflect S-polarized light having a wavelength of 490 nm or less. In addition, first polarizing dichroic mirror 42 largely reflects and does not transmit S-polarized light having a wavelength longer than 490 nm.

If the characteristics of first polarizing dichroic mirror 42 are expressed in terms of its action upon colored light, with respect to red and green light, first polarizing dichroic mirror 42 transmits P-polarized light and reflects S-polarized light. In other words, first polarizing dichroic mirror 42 also acts as a polarization beam splitter with respect to red and green light.

Regarding blue light, first polarizing dichroic mirror 42 transmits and does not act in any way upon P-polarized light and S-polarized light. In other words, first polarizing dichroic mirror 42 transmits and does not reflect red, green, and blue P-polarized light, i.e., white P-polarized light, but reflects red and green S-polarized light.

Figure 19:
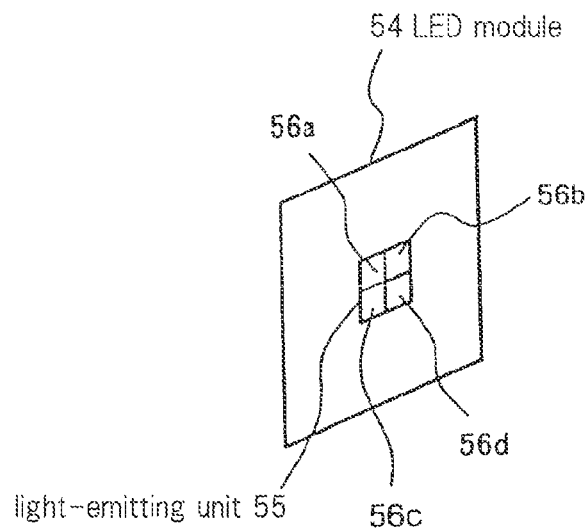
FIG. 19 is a schematic view showing the configuration of the LED module used as the second light source shown in FIG. 17.

FIG. 19 is a schematic view showing the configuration of an LED module that is used as second light source 43b.

Referring to FIG. 19, LED module 54 includes light-emitting unit 55 composed of four LED chips 56a-56d. All of LED chips 56a-56c are composed of red LEDs having a peak wavelength of 630 nm. LED chip 56d is composed of a green LED having a peak wavelength of 530 nm. The chip areas of LED chips 56a-56d are substantially equal.

The area of light-emitting unit 55 is determined by the f-number of the projection lens and the area of the display element of the projection-type display device in which light source device of the present exemplary embodiment is installed based on the previously described constraints of etendue. When determining the area, however, factors such as the positioning margins for fabrication and the uniformity of the illuminance distribution of the illumination light are taken into consideration.

Figure 20:
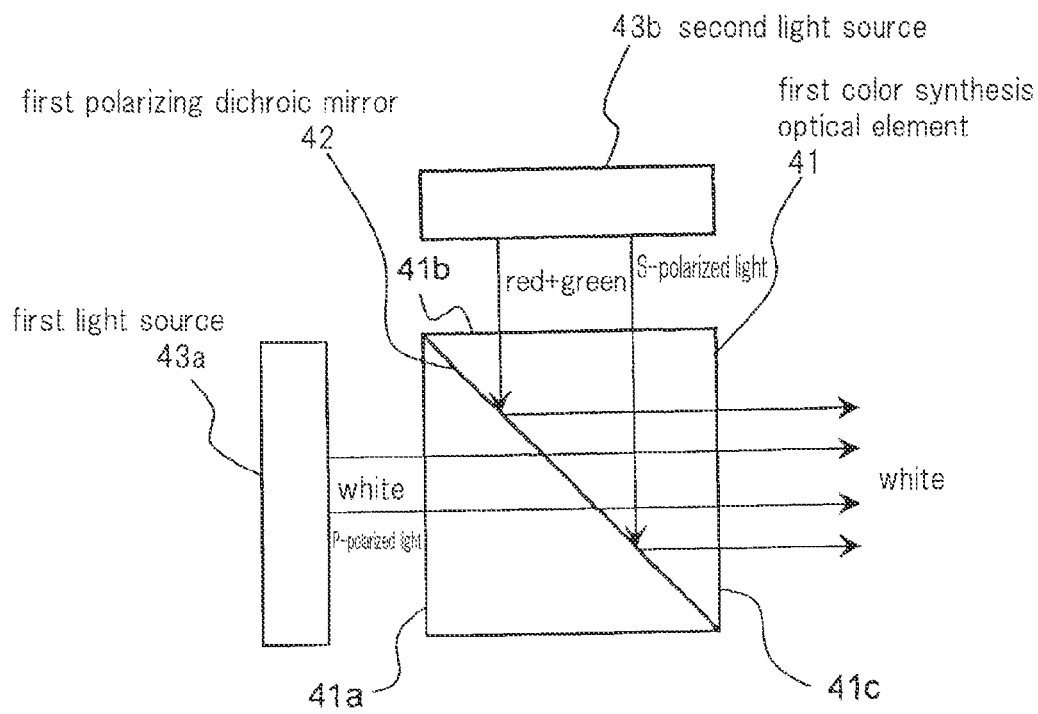
FIG. 20 is a schematic view showing an example of the optical paths in which colors are synthesized in the light source device shown in FIG. 17.

FIG. 20 is a plan view for describing the optical paths when the light source device shown in FIG. 17 is used in the synthesis of colored light. In FIG. 20, lines represented as solid lines with arrows indicate representative directions of progression of incident luminous flux. However, this does not mean that only the lines represented by solid lines with arrows are the actual incident rays. The incident light is luminous flux having a cross-sectional area no greater than the incident surfaces of first color synthesis optical element and includes positions other than the lines represented as solid lines with arrows as well as rays having an angular component.

White P-polarized light from first light source 43a is irradiated into incident surface 41a of first color synthesis optical element 41. First polarizing dichroic mirror 42 does not act in any way upon white P-polarized light. Accordingly, white P-polarized light passes through first polarizing dichroic mirror 42 without alteration, as shown in FIG. 20.

On the other hand, red and green S-polarized light from second light source 43b is irradiated into incident surface 41b of first color synthesis optical element 41. First polarizing dichroic mirror 42 reflects all red and green S-polarized light. Accordingly, the luminous flux of red and green S-polarized light is bent 90 degrees by first polarizing dichroic mirror 42 and then exited from exit surface 41c, as shown in FIG. 20.

As described hereinabove, in the light source device of the present exemplary embodiment, white light that has been augmented by red and green can be obtained by synthesizing white P-polarized light that is irradiated from incident surface 41a and red and green S-polarized light that is irradiated from incident surface 41b by means of first polarizing dichroic mirror 42.

Figure 21A:
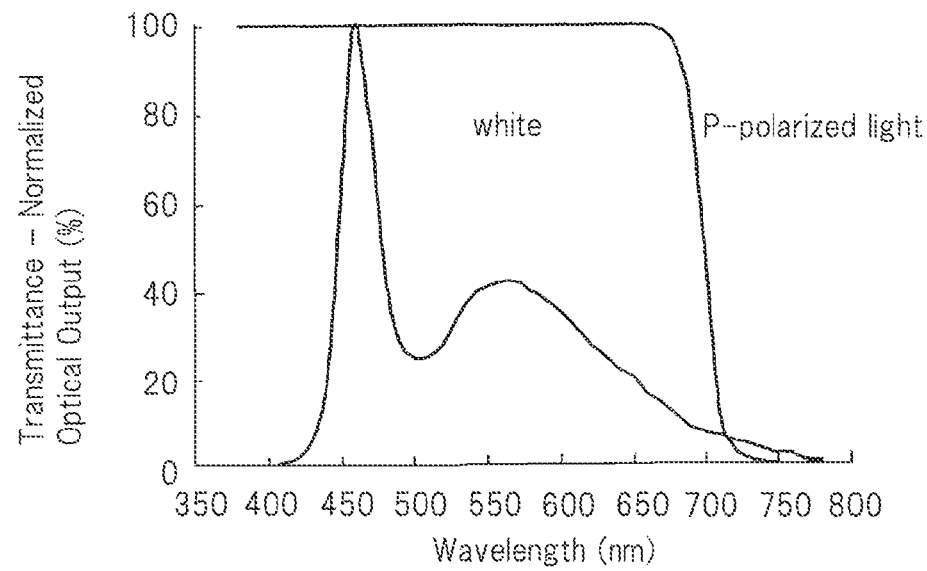
FIG. 21A is a graph showing the relation between the emission spectrum of a white LED and the spectral transmittance characteristic with respect to P-polarized light of the first polarizing dichroic mirror of the first color synthesis optical element shown in FIG. 17.

FIG. 21A is a graph showing the relation between the emission spectrum of a white LED and the spectral transmittance characteristic with respect to P-polarized light of first polarizing dichroic mirror 42. The emission spectrum of the white LED has a steep peak at a wavelength of 460 nm in the blue wavelength band and a gentle peak at a wavelength of 565 nm in the yellow wavelength band.

Figure 21B:
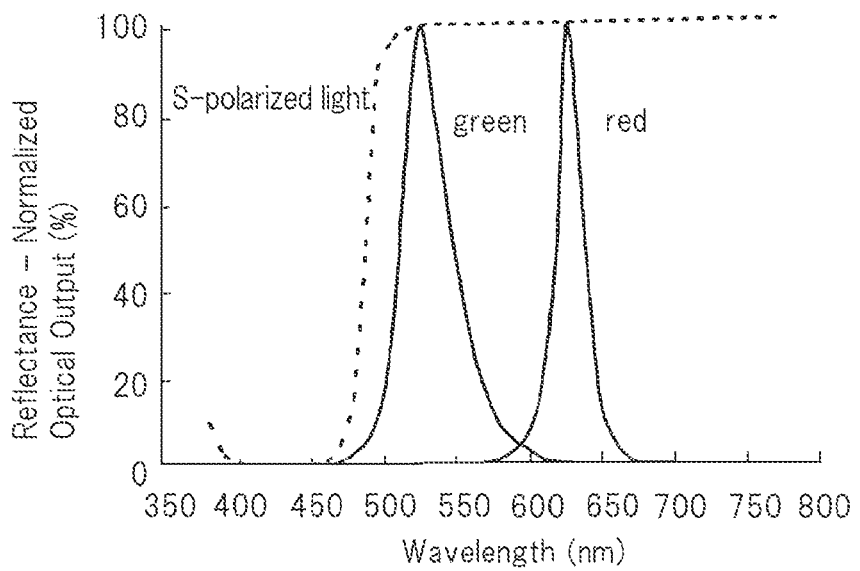
FIG. 21B is a graph showing the relation between the emission spectrums of each of red and green LEDs and the spectral reflectance characteristic with respect to S-polarized light of the first polarizing dichroic mirror of the first color synthesis optical element shown in FIG. 17.

FIG. 21B is a graph showing the relation between the emission spectrums of each of red and green LEDs and the spectral reflectance characteristic with respect to S-polarized light of first polarizing dichroic mirror 42. The peak wavelength of the red LED is 630 nm and the peak wavelength of the green LED is 530 nm.

As is clear from FIGS. 21A and 21B, white, red, and green light from different directions and at different polarizations are synthesized, whereby colored light can be efficiently synthesized. In other words, optical loss does not occur because, rather than replacing the red and green components that are insufficient in the white LED with the light of a red LED and green LED, the light of a red LED and green LED are added to the light of the white LED.

The amount of light of the red LED and green LED can be adjusted independent of the amount of light of the white LED. Accordingly, the present exemplary embodiment can provide a light source device having high light utilization efficiency when mixing colors and having a high degree of flexibility in adjusting white balance.

Fifth Exemplary Embodiment

Using the light source device of each of the above-described exemplary embodiments enables the realization of a projection-type display device that obtains a bright projected image. A projection-type display device that is equipped with such a light source device is next described.

Figure 22:
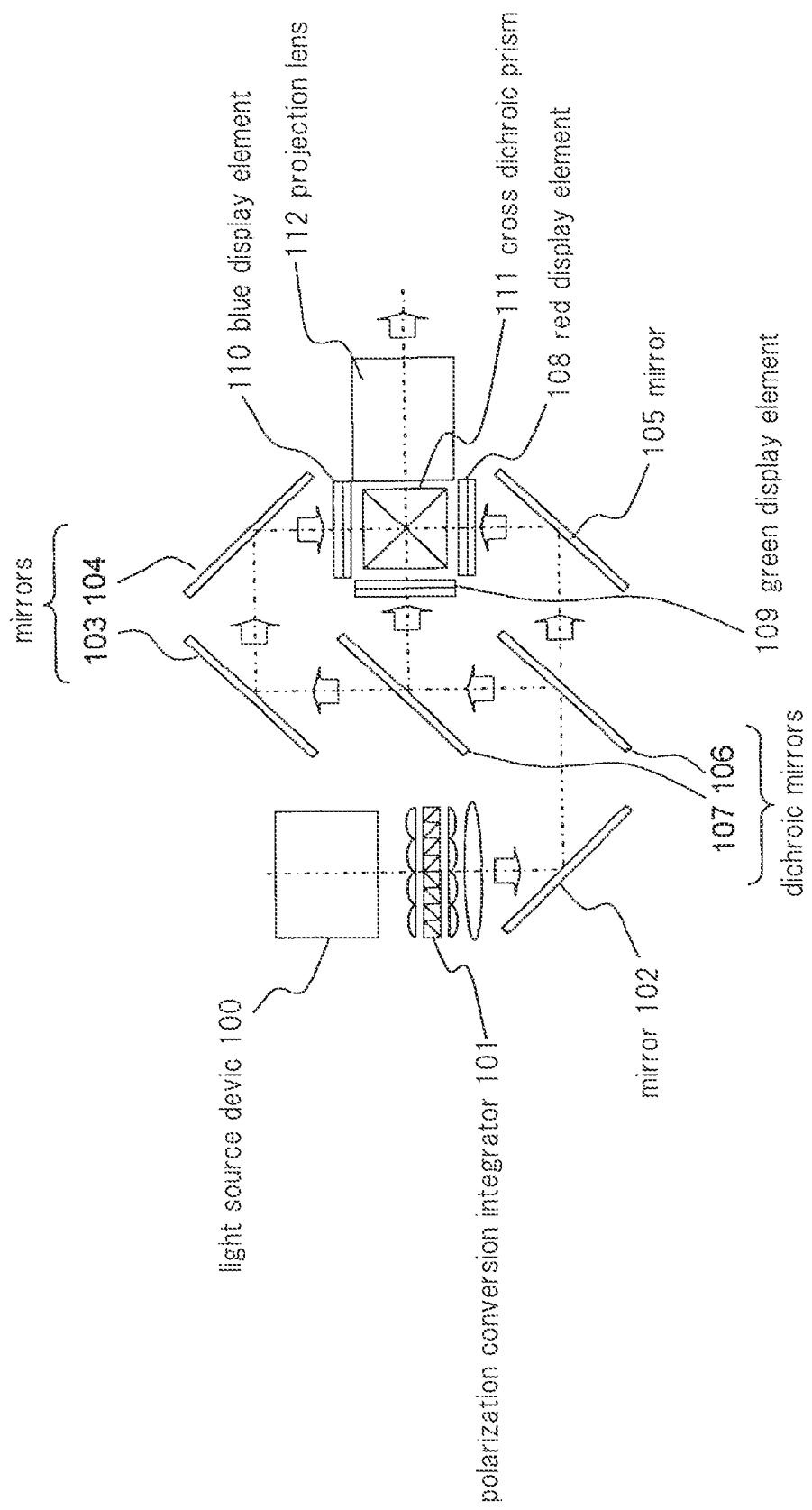
FIG. 22 is a block diagram showing the configuration of the projection-type display device that is the fifth exemplary embodiment of the present invention.

FIG. 22 is a block diagram showing the configuration of a projection-type display device that is the fifth exemplary embodiment of the present invention.

Referring to FIG. 22, the projection-type display device includes: light source device 100, polarization conversion integrator 101, mirrors 102-105, dichroic mirrors 106 and 107, red display element 108, green display element 109, blue display element 110, cross dichroic prism 111, and projection lens 112.

Light source device 100 is the light source device of the second exemplary embodiment shown in FIG. 7 and emits P-polarized light (white) and S-polarized light (red and green). The configuration apart from light source device 100 is the same configuration as a known three-panel projection-type display device.

Polarization conversion integrator 101 is made up of a set of fly-eye lenses, a polarization beam splitter array, and a half-wave plate. The luminous flux that is incident from light source device 100 is split into a plurality of beams by the fly-eye lenses. Each of these beams is separated into orthogonal polarization components by a polarization beam splitter, following which the polarization direction of the light of one of the polarization components is rotated 90 degrees by the half-wave plate. In other words, the luminous flux irradiated into polarization conversion integrator 101 is converted into beams in which the polarization directions are all aligned. The plurality of beams in which polarization directions are all aligned is then superposed as a single beam by an exit-side fly-eye lens.

Mirror 102 is arranged in the direction of progression of light that is exited from polarization conversion integrator 101, and dichroic mirror 106 is arranged in the direction of progression of light that is reflected by mirror 102. Dichroic mirror 106 transmits red light and reflects green and blue light.

Mirror 105 is arranged in the direction of progression of the red light that has passed through dichroic mirror 106, and red display element 108 is arranged in the direction of progression of red light that is reflected by mirror 105.

Dichroic mirror 107 is arranged in the direction of progression of green and blue light that is reflected by dichroic mirror 106. Dichroic mirror 107 transmits blue light and reflects green light.

Green display element 109 is arranged in the direction of progression of green light that is reflected by dichroic mirror 107. Mirror 103 is arranged in the direction of progression of blue light that passes through dichroic mirror 107. Mirror 104 is arranged in the direction of progression of blue light that is reflected by mirror 103. Blue display element 110 is arranged in the direction of progression of blue light that is reflected by mirror 104.

Cross dichroic prism 111 is provided in the position of the intersection of red light that has passed through red display element 108, green light that has passed through green display element 109, and blue light that has passed through blue display element 110.

Of the four side surfaces of cross dichroic prism 111, three are incident surfaces (first to third incident surfaces) and the remaining side surface is the exit surface. The red light from red display element 108 is irradiated to the first incident surface. The green light from green display element 109 is irradiated to the second incident surface. The blue light from blue display element 110 is irradiated to the third incident surface. In cross dichroic prism 111, the red light irradiated from the first incident surface, the green light irradiated from the second incident surface, and the blue light irradiated from the third incident surface are synthesized and the synthesized light is then exited from the exit surface.

Projection lens 112 is provided in the direction of progression of light that is exited from the exit surface of cross dichroic prism 111. Projection lens 112 projects the images formed in red display element 108, green display element 109, and blue display element 110 onto a screen (not shown).

In the projection-type display device of the present exemplary embodiment, light from light source device 100 is separated into luminous flux of the three primary colors red, green, and blue by dichroic mirrors 106 and 107. The red luminous flux is irradiated to red display element 108, the green luminous flux is irradiated to green display element 109, and the blue luminous flux is irradiated to blue display element 110.

The beams that have undergone intensity modulation according to the images of the color components of each color by red display element 108, green display element 109, and blue display element 110 are synthesized in cross dichroic prism 111 and projected onto the screen by projection lens 112.

FIG. 22 is a schematic view showing only the main constituent elements. In actuality, other optical parts are used such as condensing lenses for efficiently irradiating the beams to each display element.

According to the present exemplary embodiment, by using the light source device described in the second exemplary embodiment, a projection-type display device can be realized that obtains a bright projected image.

The effects of the projection-type display device of the present exemplary embodiment are next described.

Figure 23A:
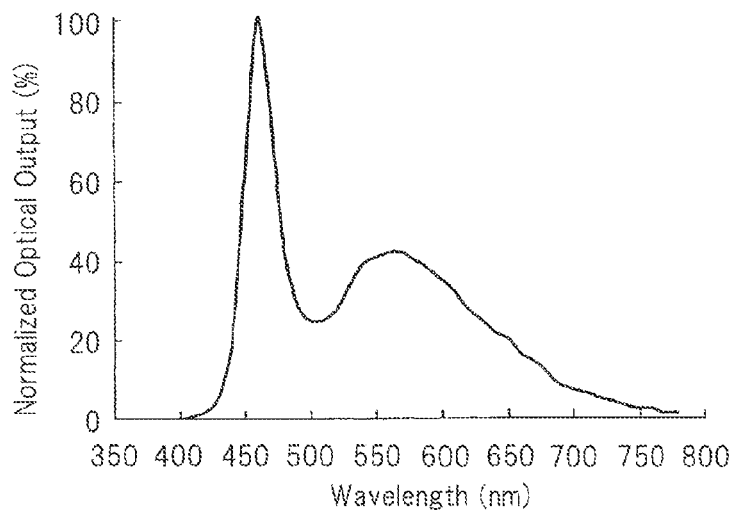
FIG. 23A is the emission spectrum of the white LED that is used in the projection-type display device shown in FIG. 22.
Figure 23B:
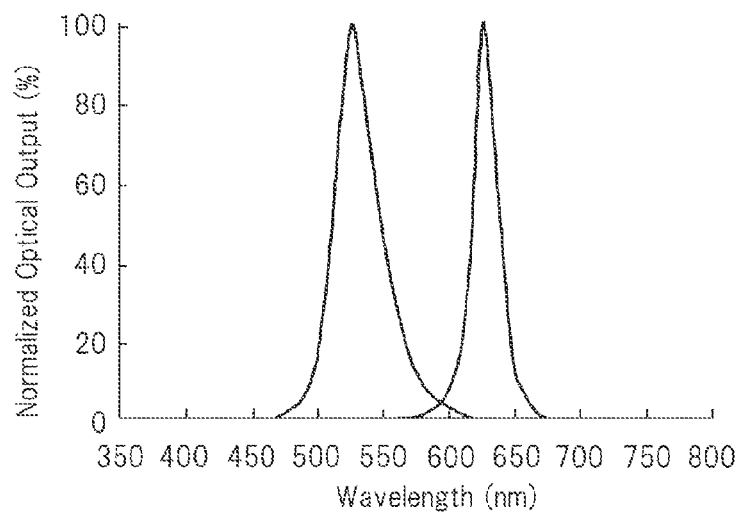
FIG. 23B is the emission spectrums of the red LED and green LED that are used in the projection-type display device shown in FIG. 22.

Light source device 100 is provided with three light sources 3a-3c as shown in FIG. 7. FIG. 23A shows the emission spectrum of white LEDs that are used as first light source 3a. FIG. 23B shows the emission spectrums of the red LEDs that are used as second light source 3b and the green LEDs that are used as third light source 3c for augmenting the color component that is insufficient in the white LEDs.

The chromaticity coordinates of the emission spectrum of the white LED shown in FIG. 23A are (0.313, 0.327). These chromaticity coordinates indicate a good white that ranks with the white chromaticity (0.313, 0.329) of standard illuminant D65.

As previously described, a color image in a display device is made up of images of the three primary colors red, green, and blue. As a result, the luminous flux of yellow having a wavelength of from 565 nm-595 nm and blue-green having a wavelength around 500 nm must be eliminated from the emitted luminous flux of a white LED to extract the luminous flux of the narrow wavelength bands of the three primary colors red, green, and blue.

Figure 23C:
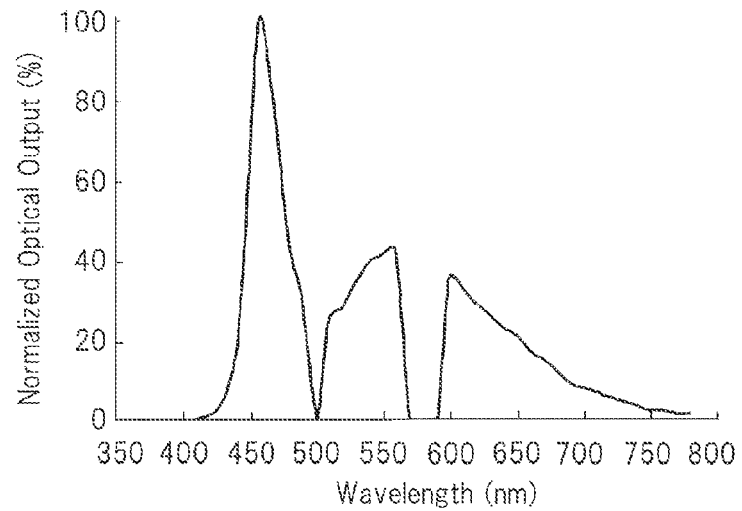
FIG. 23C is the spectrum following elimination of yellow and blue-green luminous flux from the emitted luminous flux of the white LED that is used in the projection-type display device shown in FIG. 22.

FIG. 23C shows the spectrum following the elimination of the luminous flux of yellow and blue-green from the emitted luminous flux of the white LED. The chromaticity coordinates of the luminous flux of the red, green, and blue bands are (0.677, 0.323), (0.231, 0.726), and (0.133, and 0.057), respectively. These chromaticity coordinates are equivalent to the three primary color chromaticity standards (0.670, 0.333), (0.210, 0.710), (0.140, 0.080) of the NTSC (National Television System Committee) and are the standards for analog television.

However, in the case described above, the white chromaticity coordinates are (0.264, 0.282), which is white with a blue tinge.

Normally, in order to obtain a satisfactory white, the luminous flux of blue and green is limited while taking the red luminous flux, which is the weakest, as a standard. This limitation results in a marked drop in light utilization efficiency.

Figure 23D:
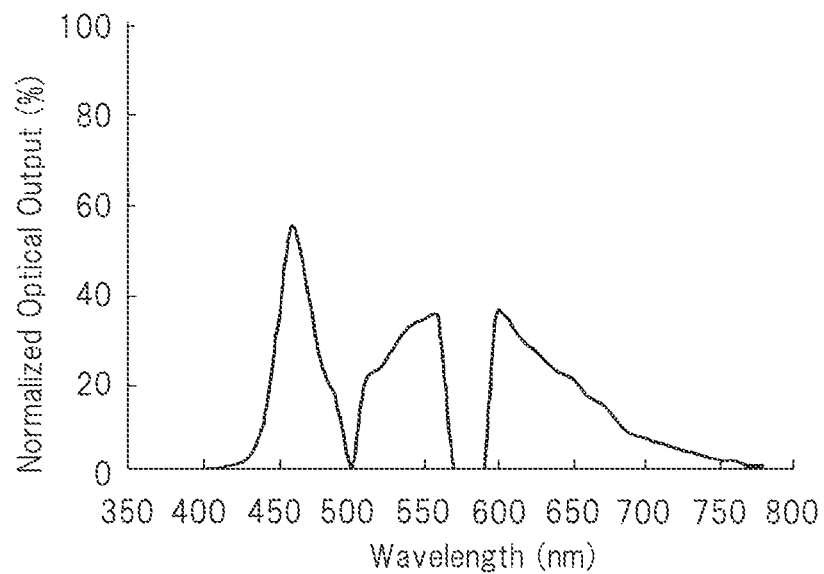
FIG. 23D is the spectrum after establishing white balance, and further, after eliminating the yellow and blue-green luminous flux from the emitted luminous flux of the white LED that is used in the projection-type display device shown in FIG. 22.

FIG. 23D shows the spectrum following elimination of the yellow and blue-green luminous flux from the emitted luminous flux of a white LED, and further, after establishing white balance.

The blue luminous flux was decreased to 55% and the green luminous flux was decreased to 82%. As a result, the obtained white chromaticity coordinates were (0.311, 0.331) and good white could be achieved. However, the amount of light was 56% of the original amount of light of white LED, and the light utilization efficiency is therefore drastically reduced.

In the light source device of the present exemplary embodiment, rather than decreasing the amount of blue and green light in accordance with the amount of red light, which is the lowest level, from the spectrum shown in FIG. 23C, the amounts of green and red luminous flux are added in accordance with the amount of blue light, which is the highest level.

Figure 23E:
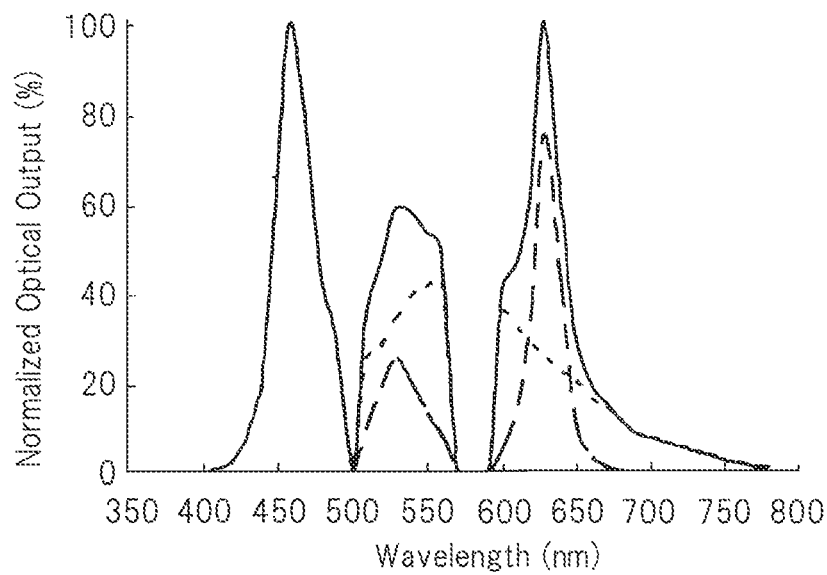
FIG. 23E is the spectrum of the white LED to which red and green luminous flux have been added following the elimination of yellow and blue-green luminous flux from the emitted luminous flux of the white LED that is used in the projection-type display device shown in FIG. 22.

FIG. 23E shows the spectrum of a white LED to which red and green luminous flux has been added. In FIG. 23E, the dotted line is the spectrum shown in FIG. 23C. The broken lines show the spectrums of the red LED and green LED that have been added to the light of the white LED in light source device 100. The solid lines show the spectrums following addition of the light of the red LED and green LED to the white LED.

Of the spectrums of red and green shown in FIG. 23B, the amounts of red and green light that are added to obtain white balance are 75% and 25%, respectively. By adding this light, the amount of white light becomes 102% of the original amount of light of the white LED, whereby sufficient brightness is obtained. The chromaticity coordinates of white light that is obtained are (0.318, 0.327), indicating that a satisfactory white has been obtained.

The chromaticity coordinates of the red, green, and blue bands of luminous flux are (0.684, 0.316), (0.213, 0.737), and (0.133, 0.057), respectively, and good luminous flux of the three primary colors is obtained.

According to the present exemplary embodiment as described hereinabove, by using the light source device of the second exemplary embodiment, a projection-type display device can be obtained that obtains a bright projected image.

In the projection-type display device of the present exemplary embodiment, moreover, light source device 100 is not limited to the light source device of the second exemplary embodiment. The light source device of any of the first, third, and fourth exemplary embodiments may also be used as light source device 100. In these cases as well, a projection-type display device can be provided that obtains a bright projected image.

In addition, red display element 108, green display element 109, and blue display element 110 may also be made up of devices other than liquid crystal light valves, for example, digital mirror devices.

Each of the light source devices and projection-type display devices that use the light source devices of the above-described exemplary embodiments are only examples of the present invention, and the configuration and operations can be modified as appropriate within a range that does not depart from the gist of the present invention.

In each of the exemplary embodiments, an anti-reflection coating composed of a dielectric multilayer film may be applied to each incident and exit surface of first color synthesis optical element 1, second color synthesis optical element 11, and third color synthesis optical element 21 to reduce optical loss caused by surface reflection.

In addition, in the second exemplary embodiment, first color synthesis optical element 1 and second color synthesis optical element 11 may be adhered by means of an adhesive in which the index of refraction is matched. Similarly, in the third exemplary embodiment, first color synthesis optical element 1, second color synthesis optical element 11, and third color synthesis optical element 21 may be adhered by means of an adhesive in which the index of refraction is matched. Still further, the opposing right angle prisms may be configured as a unified prism. This configuration enables an even more compact light source device.

In the third exemplary embodiment, the arrangement of fourth light source 3d and second color synthesis optical element 11 is not limited to the arrangement shown in FIG. 15. For example, the arrangement of fourth light source 3d and second color synthesis optical element 11 may be arranged linearly symmetrical to the arrangement shown in FIG. 15 with the optical axis of first light source 3a as a reference. The same holds true for the arrangement of second light source 3b and first color synthesis optical element 1 and the arrangement of third light source 3c and second color synthesis optical element 11. However, an arrangement such that second light source 3b, third light source 3c, and fourth light source 3d differ from each other can prevent interference between parts.

In the light source device of each exemplary embodiment, the polarizing dichroic mirrors used in first color synthesis optical element 1, second color synthesis optical element 11, third color synthesis optical element 21, and first color synthesis optical element 41 are not limited to a dielectric multilayer film and may also be an optical film having wavelength selectivity or polarization selectivity such as a hologram.

Still further, first color synthesis optical element 1, second color synthesis optical element 11, third color synthesis optical element 21, and first color synthesis optical element 41 may be components in which film is formed on plate glass rather than a prism form.

Although LEDs were used for each of light sources 3a, 3b, 3c, and 3d, other solid-state light sources such as semiconductor lasers may also be used.

The projection-type display device in which the light source device of the present invention is applied can also be a single-panel projection-type display device instead of a three-panel projection-type display device.

As the white LED that produces white light, a type of LED is used in which a fluorescent substance that emits yellow light is excited by blue light to obtain white light by blue and yellow light, but another type of LED may be used in which a fluorescent substance that emits red, green, and blue light is excited by ultraviolet light to obtain white light.

Although forms have been described in which the light source device of the present invention is applied to a projection-type display device, the light source device of the present invention may also be applied to an illumination device of a display device that is not a projecting type. Still further, the light source device of the present invention can also be applied to an illumination device that is not limited to a display device. The light source device of the present invention is particularly effective in a device that illuminates an object by way of optics such as the illumination device of a microscope or a spotlight.

The light source device of the present invention may adopt any configuration that allows the addition of light of a first polarization that includes light of two or more colors and light of a second polarization in which the polarization state differs from that of the first polarization that includes at least one of the plurality of included colors. The added light is not limited to light of the three primary colors, and the light of any color such as yellow or blue-green light may be synthesized. The light that is synthesized by the color synthesis optical element is not necessarily white. According to this configuration, an illumination device can be realized that obtains bright light. In addition, toning can be realized by adjusting the ratio of the light of the color that is added, whereby an illumination device can be realized that can obtain, for example, a white light for which white balance can be adjusted.

According to one aspect of the present invention, the light source device includes: a first light source that emits light of a first polarization of a plurality of colors having different wavelength; a light source means that emits light of a second polarization in which the polarization state differs from the first polarization and that includes light of at least one color of the above-described plurality of colors; and a color synthesis means that synthesizes light of the above-described first polarization that has been emitted from the above-described first light source and light of the above-described second polarization that has been emitted from the above-described light source means.

In the configuration shown in FIG. 2, the first light source corresponds to first light source 3a, the light source means corresponds to the second light source 3b, and the color synthesis means corresponds to first color synthesis optical element 1. In the configuration shown in FIG. 7, the first light source corresponds to first light source 3a, the light source means corresponds to second light source 3b and third light source 3c, and the color synthesis means corresponds to first color synthesis optical element 1 and second color synthesis optical element 11. In the configuration shown in FIG. 13, the first light source corresponds to first light source 3a, the light source means corresponds to second light source 3b, third light source 3c, and fourth light source 3d, and the color synthesis means corresponds to first color synthesis optical element 1, second color synthesis optical element 11, and third color synthesis optical element 21. In the configuration shown in FIG. 17, the first light source corresponds to first light source 43a, the light source means corresponds to second light source 43b, and the color synthesis means corresponds to first color synthesis optical element 41.

In the configuration shown in FIG. 17, third color synthesis optical element 21 and fourth light source 3d shown in FIG. 13 may be added. In this case, third color synthesis optical element 21 synthesizes the exited light from first color synthesis optical element 41 (white P-polarized light and red and green S-polarized light) and the emitted light from fourth light source 3d (blue S-polarized light).

In the above-described configuration, the correspondence relations with the configuration described as the above-described aspect is as shown hereinbelow. The first light source corresponds to first light source 43a, the light source means corresponds to second light source 43b and fourth light source 3d, and the color synthesis means corresponds to first color synthesis optical element 41 and third color synthesis optical element 21.

Although the present invention has been described with reference to exemplary embodiments, the present invention is not limited to the above-described exemplary embodiments. The configuration and operations of the present invention are open to various modifications within a scope that does not depart from the gist of the present invention that will be clear to one of ordinary skill in the art.

This application claims the benefits of priority based on Japanese Patent Application No. 2009-222704 for which application was submitted on Sep. 28, 2009 and incorporates by citation all of the disclosures of that application.

What is claimed is:

1. A light source device comprising:
   a first light source that emits light of a plurality of colors including different wavelengths of a first polarization;
   a light source unit that emits light of a second polarization whose polarization state differs from that of the first polarization and that includes light of at least one color among said plurality of colors; and
   a color synthesis unit that synthesizes light of said first polarization that is emitted from said first light source and light of said second polarization that is emitted from said light source unit,
   wherein:
   said light source unit includes a second light source that emits first colored light of said second polarization whose peak wavelength is set in a first wavelength band; and
   said color synthesis unit includes a first color synthesis optical element that synthesizes light of said first polarization that is emitted from said first light source and first colored light of said second polarization that is emitted from said second light source;
   wherein:
   said first color synthesis optical element includes:
   a first exit surface;
   a first incident surface to which light of said plurality of colors of said first polarization is supplied from said first light source;
   a second incident surface to which first colored light of said second polarization is supplied from said second light source; and
   a first film that selectively reflects or transmits incident light according to the wavelength of the light;
   wherein:
   said first film transmits, from among visible light of said first polarization, at least light of said plurality of colors, and reflects, from among visible light of said second polarization, at least light of said first wavelength band;
   the cutoff wavelength of said first film with respect to said second polarization is set within a range of bands other than said first wavelength band; and
   light of said plurality of colors of said first polarization that is irradiated from said first incident surface and first colored light of said second polarization that is irradiated from said second incident surface are exited from said first exit surface by way of said first film.

2. The light source device as set forth in claim 1, wherein said second light source comprises a solid-state light source whose peak wavelength is set in the red wavelength band.

3. The light source device as set forth in claim 1, wherein said first light source is a white light source.

4. A projection-type display device comprising: a light source device as set forth in claim 1;
   display elements that are irradiated by light from said light source device; and
   projection optics that project images displayed by said display elements.

5. A projection-type display device comprising: the light source device as set forth in claim 1;
   a polarization conversion unit that converts, of light of a first and second polarization that is emitted from said light source device, light of one polarization to light of the other polarization;

a color separation unit that separates light of said other polarization that is exited from said polarization conversion unit into red, green, and blue light;
a first display element that is irradiated by red light that was separated by said color separation unit;
a second display element that is irradiated by green light that was separated by said color separation unit;
a third display element that is irradiated by blue light that was separated by said color separation unit; and
projection optics that project images that are displayed by said first to third display elements.

6. A light source device comprising:
a first light source that emits light of a plurality of colors including different wavelengths of a first polarization;
a light source unit that emits light of a second polarization whose polarization state differs from that of the first polarization and that includes light of at least one color among said plurality of colors; and
a color synthesis unit that synthesizes light of said first polarization that is emitted from said first light source and light of said second polarization that is emitted from said light source unit,
wherein:
said light source unit comprises a second light source that emits first colored light of said second polarization whose peak wavelength is set in said first wavelength band and that emits second colored light of said second polarization whose peak wavelength is set in a second wavelength band that differs from the first wavelength band; and
said color synthesis unit comprises a first color synthesis optical element that synthesizes light of said first polarization that is emitted from said first light source and first and second colored light of said second polarization that are emitted from said second light source;
wherein:
said first color synthesis optical element comprises:
a first exit surface;
a first incident surface to which light of said plurality of colors of said first polarization is supplied from said first light source;
a second incident surface to which said first and second colored light of said second polarization are supplied from said second light source; and
a first film that selectively reflects or transmits incident light according to the wavelength of the light;
wherein:
said first film transmits, from among visible light of said first polarization, at least light of said plurality of colors and reflects, from among visible light of said second polarization, at least light of said first and second wavelength bands;
the cutoff wavelength of said first film with respect to said second polarization is set within a band range other than said first wavelength band and said second wavelength band; and
light of said plurality of colors of said first polarization that is irradiated from said first incident surface and first and second colored light of said second polarization that is irradiated from said second incident surface are exited from said first exit surface by way of said first film.

7. The light source device as set forth in claim 6, wherein said second light source comprises:
a solid-state light source whose peak wavelength is set in the red wavelength band; and
a solid-state light source whose peak wavelength is set in the green wavelength band.

8. A light source device comprising:
a first light source that emits light of a plurality of colors including different wavelengths of a first polarization;
a light source unit that emits light of a second polarization whose polarization state differs from that of the first polarization and that includes light of at least one color among said plurality of colors; and
a color synthesis unit that synthesizes light of said first polarization that is emitted from said first light source and light of said second polarization that is emitted from said light source unit,
wherein:
said light source unit includes: a second light source that emits first colored light of said second polarization whose peak wavelength is set in a first wavelength band; and a third light source that emits second colored light of said second polarization whose peak wavelength is set in a second wavelength band that differs from said first wavelength band;
wherein:
said color synthesis unit includes: a first color synthesis optical element that synthesizes light of said first polarization that is emitted from said first light source and first colored light of said second polarization that is emitted from said second light source; and a second color synthesis optical element that synthesizes light that is exited from said first color synthesis optical element and second colored light of said second polarization that is emitted from said third light source;
wherein:
said first color synthesis optical element includes:
a first exit surface;
a first incident surface to which light of said plurality of colors of said first polarization is supplied from said first light source;
a second incident surface to which said first colored light of said second polarization is supplied from said second light source; and
a first film that selectively reflects or transmits incident light according to the wavelength of the light;
wherein:
said first film transmits, from among visible light of said first polarization, at least light of said plurality of colors and reflects, from among visible light of said second polarization, at least light of said first wavelength band; and
light of said plurality of colors of said first polarization that is irradiated from said first incident surface and said first colored light of said second polarization that is irradiated from said second incident surface are exited from said first exit surface by way of said first film;
and said second color synthesis optical element includes:
a second exit surface;
a third incident surface to which light of said plurality of colors of said first polarization and said first colored light of said second polarization are supplied from said first color synthesis optical element;
a fourth incident surface to which said second colored light of said second polarization is supplied from said third light source; and
a second film that selectively reflects or transmits incident light according to the wavelength of the light;
wherein:
said second film transmits, from among visible light of said first polarization, at least light of said plurality of colors, transmits, from among visible light of said second polarization, at least light of said first wavelength band, and reflects at least light of said second wavelength band;

light of said plurality of colors of said first polarization and said first colored light of said second polarization that are irradiated from said third incident surface and second colored light of said second polarization that is irradiated from said fourth incident surface are exited from said second exit surface by way of said second film; and the cutoff wavelengths of said first and second films with respect to said second polarization are set within a range of bands other than said first wavelength band and said second wavelength band.

9. The light source device as set forth in claim 8, wherein: said second light source includes a solid-state light source whose peak wavelength is set in the red wavelength band; and said third light source includes a solid-state light source whose peak wavelength is set in the green wavelength band.

10. A light source device comprising:

a first light source that emits light of a plurality of colors including different wavelengths of a first polarization;

a light source unit that emits light of a second polarization whose polarization state differs from that of the first polarization and that includes light of at least one color among said plurality of colors; and a color synthesis unit that synthesizes light of said first polarization that is emitted from said first light source and light of said second polarization that is emitted from said light source unit, wherein:

said light source unit includes: a second light source that emits first colored light of said second polarization whose peak wavelength is set in a first wavelength band; a third light source that emits second colored light of said second polarization whose peak wavelength is set in a second wavelength band that differs from said first wavelength band; and a fourth light source that emits third colored light of said second polarization, a peak wavelength of the third colored light being set in a third wavelength band that differs from said first and second wavelength bands;

wherein:

said color synthesis unit includes: a first color synthesis optical element that synthesizes light of said first polarization that is emitted from said first light source and first colored light of said second polarization that is emitted from said second light source; a second color synthesis optical element that synthesizes light that is exited from said first color synthesis optical element and second colored light of said second polarization that is emitted from said third light source; and a third color synthesis optical element that synthesizes light that is exited from said second color synthesis optical element and said third colored light of said second polarization that is emitted from said fourth light source;

wherein:

said first color synthesis optical element comprises:

a first exit surface;

a first incident surface to which light of said plurality of colors of said first polarization is supplied from said first light source;

a second incident surface to which said first colored light of said second polarization is supplied from said second light source; and a first film that selectively reflects or transmits incident light according to the wavelength of the light;

wherein:

said first film transmits, from among visible light of said first polarization, at least light of said plurality of colors and reflects, from among visible light of said second polarization, at least light of said first wavelength band; and light of said plurality of colors of said first polarization that is irradiated from of said first incident surface and said first colored light of said second polarization that is irradiated from said second incident surface are exited from said first exit surface by way of said first film;

said second color synthesis optical element comprises:

a second exit surface;

a third incident surface to which light of said plurality of colors of said first polarization and said first colored light of said second polarization are supplied from said first color synthesis optical element;

a fourth incident surface to which said second colored light of said second polarization is supplied from said third light source; and a second film that selectively reflects or transmits incident light according to the wavelength of the light;

wherein:

said second film transmits, from among visible light of said first polarization, at least light of said plurality of colors, transmits, from among visible light of said second polarization, at least light of said first wavelength band, and reflects at least light of said second wavelength band; and light of said plurality of colors of said first polarization and said first colored light of said second polarization that are irradiated from said third incident surface and said second colored light of said second polarization that is irradiated from said fourth incident surface are exited from said second exit surface by way of said second film; and said third color synthesis optical element comprises:

a third exit surface;

a fifth incident surface to which light of said plurality of colors of said first polarization and first and second colored light of said second polarization are supplied from said second color synthesis optical element;

a sixth incident surface to which third colored light of said second polarization is supplied from said fourth light source; and a third film that selectively reflects or transmits incident light according to the wavelength of the light;

wherein:

said third film transmits, from among visible light of said first polarization, at least light of said plurality of colors, transmits, from among visible light of said second polarization, at least light of said first and second wavelength bands, and reflects at least light of said third wavelength band;

light of said plurality of colors of said first polarization and first and second colored light of said second polarization that are irradiated from said fifth incident surface and said third colored light of said second polarization that is irradiated from said sixth incident surface are exited from said third exit surface by way of said third film; and the cutoff wavelengths of said first to third films with respect to said second polarization are set within a range of bands other than said first wavelength band, said second wavelength band, and said third wavelength band.

11. The light source device as set forth in claim 10, wherein: said second light source includes a solid-state light source whose peak wavelength is set in the red wavelength band;

said third light source includes a solid-state light source whose peak wavelength is set in the green wavelength band; and said fourth light source includes a solid-state light source whose peak wavelength is set in the blue wavelength band.

12. A light source device comprising:

a first light source that emits light of a plurality of colors including different wavelengths of a first polarization;

a light source unit that emits light of a second polarization whose polarization state differs from that of the first polarization and that includes light of at least one color among said plurality of colors; and a color synthesis unit that synthesizes light of said first polarization that is emitted from said first light source and light of said second polarization that is emitted from said light source unit, wherein:

said light source unit includes: a second light source that emits first colored light of said second polarization whose peak wavelength is set in said first wavelength band and that emits second colored light of said second polarization whose peak wavelength is set in a second wavelength band that differs from the first wavelength band; and a third light source that emits third colored light of said second polarization whose peak wavelength is set in a third wavelength band that differs from said first and second wavelength bands;

wherein:

said color synthesis unit includes: a first color synthesis optical element that synthesizes light of said first polarization that is emitted from said first light source and first and second colored light of said second polarization that are emitted from said second light source; and a second color synthesis optical element that synthesizes light that is exited from said first color synthesis optical element and third colored light of said second polarization that is emitted from said third light source;

wherein:

said first color synthesis optical element comprises:

a first exit surface;

a first incident surface to which light of said plurality of colors of said first polarization is supplied from said first light source;

a second incident surface to which first and second colored light of said second polarization are supplied from said second light source; and a first film that selectively reflects or transmits incident light according to the wavelength of the light;

wherein:

said first film transmits, from among visible light of said first polarization, at least light of said plurality of colors and reflects, from among visible light of said second polarization, at least light of said first and second wavelength bands;

light of said plurality of colors of said first polarization that is irradiated from said first incident surface and first and second colored light that is irradiated from said second incident surface are exited from said first exit surface by way of said first film; and said second color synthesis optical element comprises:

a second exit surface;

a third incident surface to which light of said plurality of colors of said first polarization and first and second colored light of said second polarization are supplied from said first color synthesis optical element;

a fourth incident surface to which third colored light of said second polarization is supplied from said third light source; and a second film that selectively reflects or transmits incident light according to the wavelength of the light;

wherein:

said second film transmits, from among visible light of said first polarization, at least light of said plurality of colors, transmits, from among visible light of said second polarization, at least light of said first and second wavelength bands, and reflects at least light of said third wavelength band;

light of said plurality of colors of said first polarization and first and second colored light of said second polarization that are irradiated from said third incident surface and third colored light of said second polarization that is irradiated from said fourth incident surface are exited from said second exit surface by way of said second film; and the cutoff wavelengths of said first and second films with respect to said second polarization are set within a band range other than said first wavelength band, said second wavelength band, and said third wavelength band.

13. The light source device as set forth in claim 12, wherein: said second light source includes:

a solid-state light source whose peak wavelength is set in the red wavelength band;

a solid-state light source whose peak wavelength is set in the green wavelength band; and said third light source includes a solid-state light source whose peak wavelength is set in the blue wavelength band.

* * * * *